US010708044B2

(12) United States Patent
Tsuyuzaki et al.

(10) Patent No.: US 10,708,044 B2
(45) Date of Patent: Jul. 7, 2020

(54) PULSE GENERATION DEVICE USING A RADIOISOTOPE AND AUTHENTICATION SYSTEM

(71) Applicant: QUANTAGLION CO., LTD., Tokyo (JP)

(72) Inventors: Noriyoshi Tsuyuzaki, Mobara (JP); Kunihiko Negishi, Kamakura (JP)

(73) Assignee: QUANTAGLION CO., LTD., Tokyo (JP)

( * ) Notice: Subject to any disclaimer, the term of this patent is extended or adjusted under 35 U.S.C. 154(b) by 282 days.

(21) Appl. No.: 15/578,475

(22) PCT Filed: Jun. 2, 2016

(86) PCT No.: PCT/JP2016/002682
§ 371 (c)(1),
(2) Date: Nov. 30, 2017

(87) PCT Pub. No.: WO2016/194382
PCT Pub. Date: Dec. 8, 2016

(65) Prior Publication Data
US 2018/0176008 A1 Jun. 21, 2018

(30) Foreign Application Priority Data

Jun. 4, 2015 (JP) .................. 2015-113609
Jun. 1, 2016 (JP) .................. 2016-110314

(51) Int. Cl.
*H04L 9/08* (2006.01)
*G06F 21/73* (2013.01)
(Continued)

(52) U.S. Cl.
CPC ............ *H04L 9/0822* (2013.01); *G06F 21/44* (2013.01); *G06F 21/445* (2013.01); *G06F 21/73* (2013.01);
(Continued)

(58) Field of Classification Search
CPC .................. G01J 1/44; G06F 7/588
(Continued)

(56) References Cited

U.S. PATENT DOCUMENTS 5,987,483 A 11/1999 Edelkind et al.
6,986,055 B2 * 1/2006 Carlson .................. G06F 7/58
463/22

(Continued)

FOREIGN PATENT DOCUMENTS

JP 2000-339270 A 12/2000
JP 2003-198541 A 7/2003
(Continued)

OTHER PUBLICATIONS

International Preliminary Report on Patentability (Form PCT/IB/373) issued in counterpart Internaltional Application No. PCT/JP2016/002682, dated Dec. 5, 2017, with Form PCT/ISA/237. (19 pages).

(Continued)

*Primary Examiner* — Bryan F Wright
(74) *Attorney, Agent, or Firm* — Westerman, Hattori, Daniels & Adrian, LLP

(57) ABSTRACT

Provided is an apparatus including a pulse generation device and a memory. The pulse generation device includes: an emitter, which includes a radioisotope containing a number of atoms greater than a total number of identification targets; and a detector, which is configured to detect an α particle and others emitted from the emitter due to spontaneous decay of an atomic nucleus to generate electric pulses. The memory stores a number of electric pulses obtained by measuring, in advance, for a given period of time, the electric pulses that are generated in the pulse generation device (initial pulse count), a date of the measurement, and an identification numerical value obtained by digitizing a (Continued)

pulse interval between the electric pulses (initial identification numerical value).

15 Claims, 17 Drawing Sheets

(51) Int. Cl.
*G06F 21/44* (2013.01)
*H04L 9/32* (2006.01)
*H04L 29/06* (2006.01)
*G06F 7/58* (2006.01)

(52) U.S. Cl.
CPC .......... *H04L 9/0852* (2013.01); *H04L 9/3226* (2013.01); *H04L 9/3252* (2013.01); *H04L 9/3273* (2013.01); *H04L 9/3278* (2013.01); *H04L 63/0492* (2013.01); *G06F 7/588* (2013.01)

(58) Field of Classification Search
USPC ........................................................ 713/168
See application file for complete search history.

(56) References Cited

U.S. PATENT DOCUMENTS

| | | | | |
|---|---|---|---|---|
| 7,197,523 | B2* | 3/2007 | Lutkenhaus | G06F 7/588 708/255 |
| 8,766,161 | B2* | 7/2014 | Kanter | G01J 1/44 250/208.2 |
| 2006/0039558 | A1 | 2/2006 | Morii et al. | |
| 2008/0235774 | A1 | 9/2008 | Tsuyuzaki | |
| 2010/0287225 | A1 | 11/2010 | Dong | |
| 2011/0234378 | A1 | 9/2011 | Radley et al. | |
| 2013/0022197 | A1 | 1/2013 | Yamamoto et al. | |
| 2015/0212214 | A1 | 7/2015 | Azuma et al. | |

FOREIGN PATENT DOCUMENTS

| | | |
|---|---|---|
| JP | 2005-184536 A | 7/2005 |
| JP | 2005-282346 A | 10/2005 |
| JP | 2009-118402 A | 5/2009 |
| JP | 2009-171253 A | 7/2009 |
| JP | 2011-185547 A | 9/2011 |
| JP | 2012-509488 A | 4/2012 |
| WO | 2004/032098 A1 | 4/2004 |
| WO | 2005/083643 A1 | 9/2005 |
| WO | 2010/010519 A1 | 1/2010 |
| WO | 2011/117929 A1 | 9/2011 |
| WO | 2014/041836 A1 | 3/2014 |
| WO | 2014/058150 A1 | 4/2014 |

OTHER PUBLICATIONS

Extended (supplementary) European Search Report dated Dec. 19, 2018, issued in counterpart EP Application No. 16802822.3. (6 pages).

International Search Report dated Jul. 19, 2016, issued in counterpart International Application No. PCT/JP2016/002682 (2 pages).

Japanese Office Action dated Feb. 10, 2017, issued in counterpart Japanese Patent Application No. 2016-110314 w/English Translation (9 pages).

A Guide to Code Theoretical dated Feb. 10, 2017, issued in counterpart Japanese Application No. 2016-110314 (4 pages).

* cited by examiner

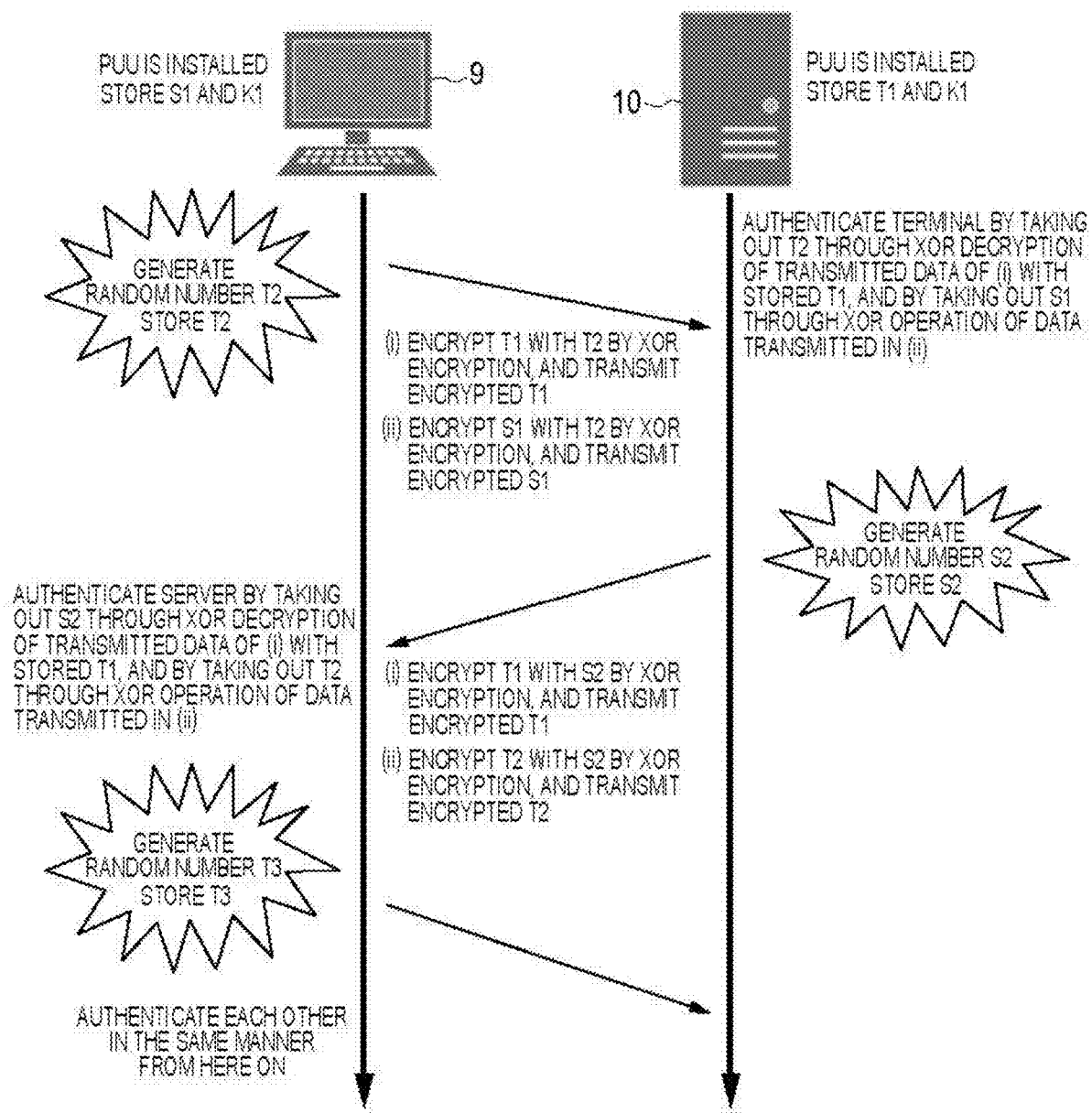

FIG. 12A
| ID | TableA | |
|---|---|---|
| P1 | K1 | P2 |
FIG. 12B
| ID | TableB | |
|---|---|---|
| P2 | K1 | P1 |
FIG. 13
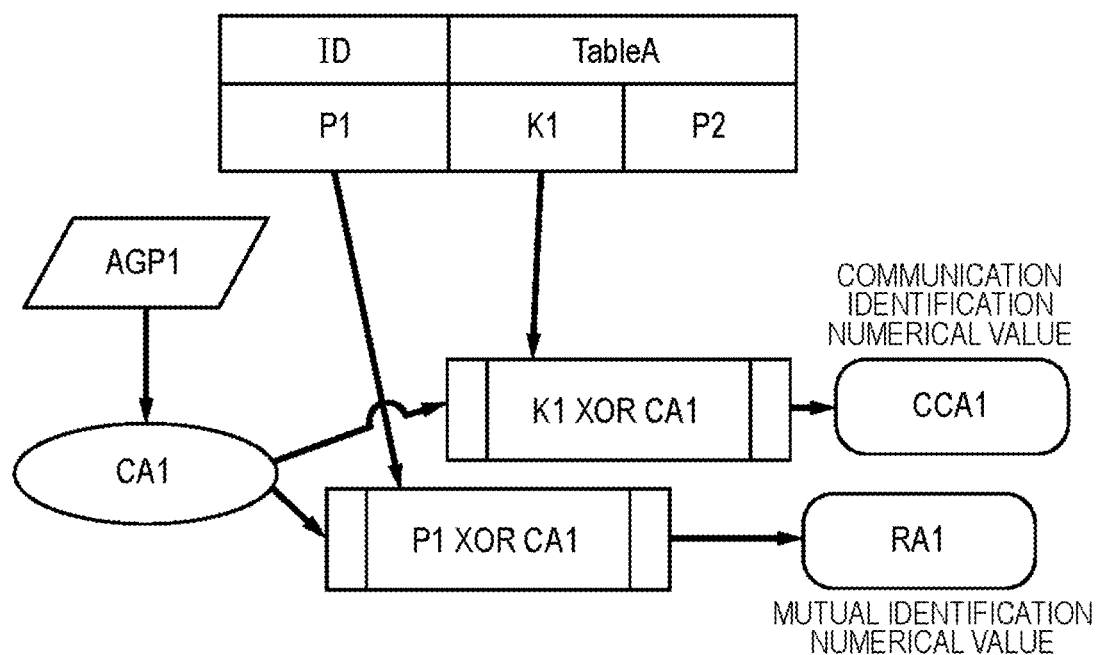
FIG. 14A
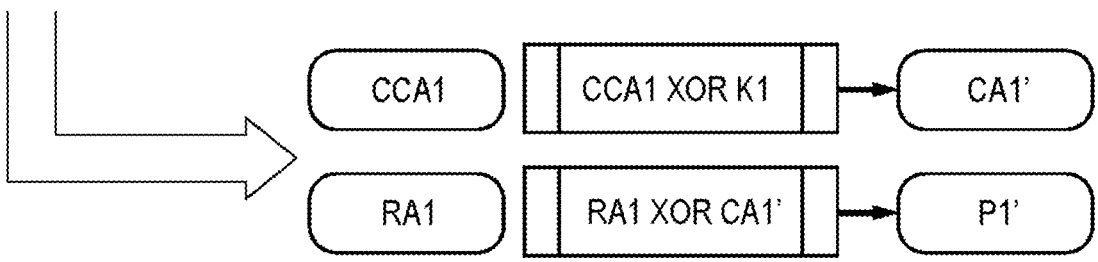

FIG. 14B
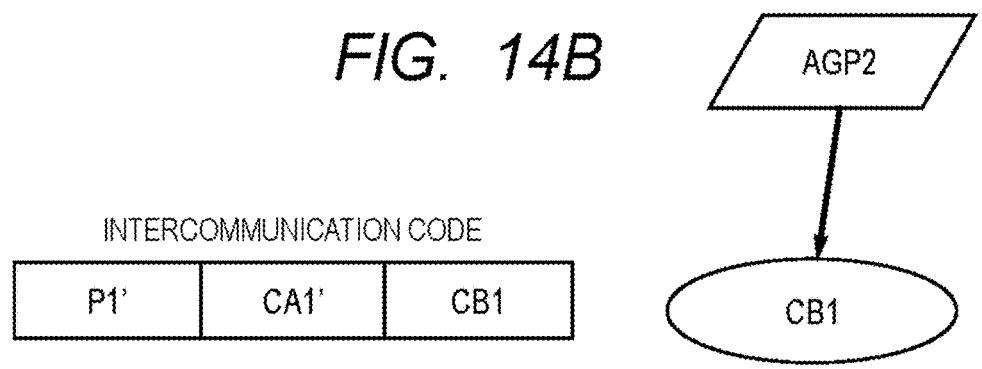
FIG. 15A
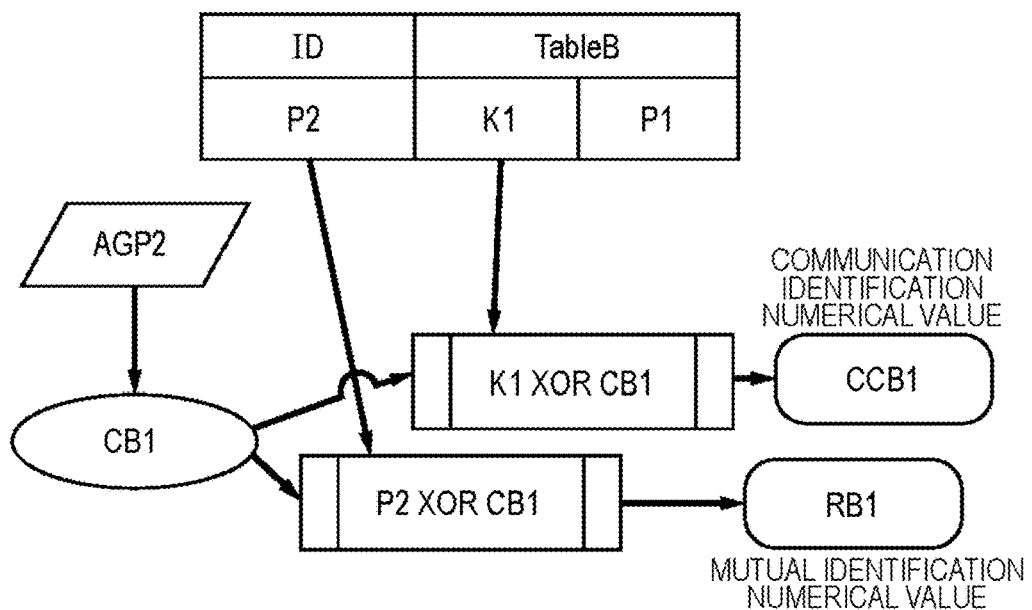
FIG. 15B
FIG. 16
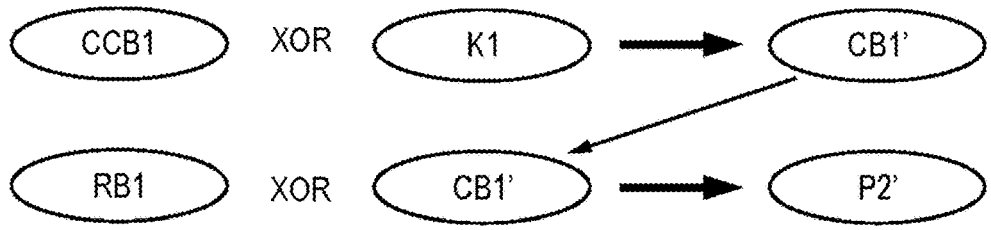

FIG. 20
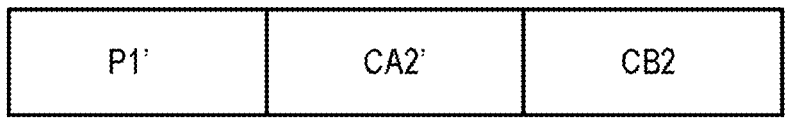
FIG. 21
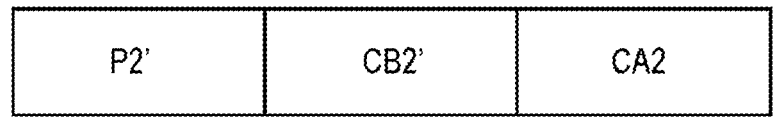
FIG. 22
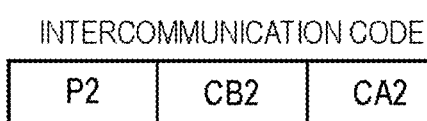 
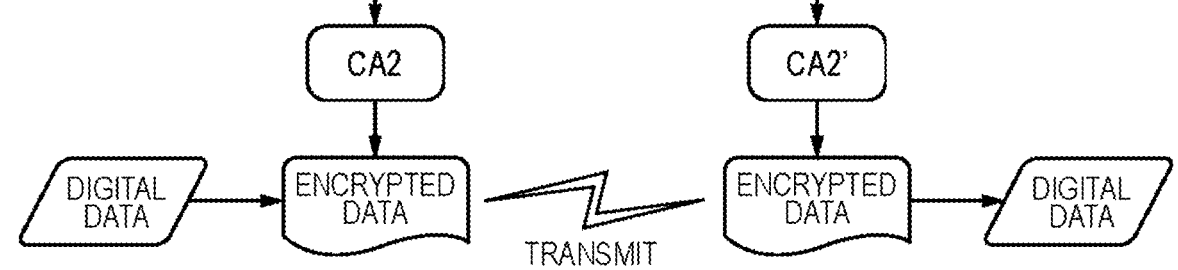

PULSE GENERATION DEVICE USING A RADIOISOTOPE AND AUTHENTICATION SYSTEM

TECHNICAL FIELD

The present invention relates to an apparatus configured to identify equipment (device) by attaining the uniqueness of the equipment, and more particularly, to an apparatus that enables authentication of communication equipment connected to a network, authentication (prevention of tampering and leakage) of electronic data, and time stamp authentication as well to be performed autonomously (without needing an outside certificate authority).

BACKGROUND ART

It is said that an era of "Internet of things (IoT)" including a trillion pieces of equipment (nodes) is coming. In order for this network to run normally, the equipment needs to be connected correctly, to operate normally, and to be maintained properly. To that end, means for identifying individual nodes connected to the network distinctly and easily is required. This gives rise to the need to assign each individual node a unique ID (an index for identification) that makes copying and impersonation difficult. The assigning of an ID is indispensable particularly to identify individual pieces of equipment and apparatus having exactly the same performance as a result of giving importance to uniformity, which allows the equipment and apparatus to be mass-produced inexpensively.

In the Internet, IP addresses are used as IDs to discriminate pieces of equipment connected to this network from one another. A method used to distribute IP addresses has initially been IPv4, but is now being shifted to IPv6 as the rapid increase in the number of pieces of equipment connected is depleting available IPv4 numbers.

A unique MAC address is assigned to each piece of equipment connected to a network in order to manage the piece of equipment. The MAC address is one of bases of a UUID, which is a standard provided in order to prevent duplication on a network. Other than simply assigning an ID number, there are cases in which an ID suitable for a situation is set. An example of such cases is "ucode", which is a standard promoted by the Ubiquitous ID Center.

Next, it is necessary to confirm that information (an electronic document or the like) received from equipment connected to a network has not been, for example, falsified or tampered (authentication of information). Data recorded in a storage apparatus of a network or of information communication equipment, in particular, is digital data and cannot be distinguished as the original from data that is a copy of the recorded data (cannot be proved as original data autonomously in an apparatus used to create the recorded data). For example, a method of checking digital data through public key cryptosystem electronic signature by providing an outside certificate authority is used to prove that the digital data is original data (see Patent Literature 1, for example). In electronic signature handled by the certificate authority, the hash value of data is obtained by a signee and encrypted with a private key, and the encrypted hash value is issued along with the document. The receiver calculates the hash value of the data, and compares the calculated hash value to a hash value decrypted with a public key to check the data.

Time stamp authentication is used as a system for proving the time at which digital data is generated (when digital data is generated). The reliability of a built-in clock is generally low in pieces of information communication equipment connected to a network. The pieces of information communication equipment therefore receive a time stamp authentication token issued by a time stamp authority (TSA) that uses a time authority (TA), create the hash value of the token and the hash value of digital data, and rely on the outside time stamp authority again by having the time stamp authority check the hash values.

CITATION LIST

Patent Literature

PTL 1: Japanese Patent Application Laid-Open No. 2009-118402

SUMMARY OF INVENTION

Technical Problem

The IP address, MAC address, and others described above are all determined by software and simply written as data in a memory, and thus are easy to copy. Once the IP address, the MAC address, and others are copied, the uniqueness of equipment is not guaranteed and which equipment is genuine cannot be identified.

In IPv6, pieces of equipment are discriminated merely by assigned numbers, and need to be managed in one place in order to avoid duplication. However, worldwide rules for IPv6 are not completely in effect, and IPv6 numbers are roughly distributed to countries to be used as appropriate by the respective countries. This means that uniqueness is not guaranteed even with IPv6 when there are duplicate numbers.

Another problem of IPv6 is that a number assigned to a piece of equipment or an apparatus that is no longer in use and a number assigned to an apparatus that does not work or that is discarded need to be managed as well, thus requiring management of an enormous amount of data to avoid duplication. One-time use of an assigned number leads to the depletion of numbers, which is a problem shared by IPv4, and is not ultimate solution to the problem.

In the public key cryptosystem electronic signature described above, the ground for uniqueness is that a public key cannot be used for decryption. The certificate authority in this case has an obligation to keep managed keys safe, and enhances security for that purpose. Still, there is a risk that a key may be deciphered.

The attachment of accurate time information to electronic information (time stamp authentication) also does not guarantee that the computerized information and the time information are not falsified or tampered by a third party on a network.

Solution to Problem

The present invention has been made to solve the related-art problems described above. According to one embodiment of the present invention, there is provided an apparatus including a pulse generation device (hereinafter also referred to as "atomic pulse generator (APG)") and a memory, the pulse generation device including: an emitter, which includes a radioisotope containing a number of atoms greater than a total number of identification targets; and a detector, which is configured to detect an α particle, a β ray, and/or a γ ray (hereinafter referred to as "α particle and others") emitted from the emitter due to spontaneous decay of an atomic nucleus to generate electric pulses, the memory being configured to store a number of electric pulses obtained by measuring, in advance, for a given period of time, the electric pulses that are generated in the pulse generation device (hereinafter referred to as "initial pulse count"), a date of the measurement, and an identification numerical value obtained by digitizing a pulse interval between the electric pulses (hereinafter referred to as "initial identification numerical value").

Further, according to one embodiment of the present invention, there is provided a system including at least two terminals, pieces of equipment, or the like between which information including digital data is transmitted and received by wireless communication or wired communication, in which one or both of the at least two terminals include the apparatus including the pulse generation device and the memory to use identification numerical values of the apparatus for authentication of the at least two terminals, pieces of equipment, or the like and/or for verification of the information.

The detector according to the invention of this application outputs an electric pulse when a current caused by the energy of the collision between radiation rays flows into the detector. Attention is paid to the fact that this electric pulse is completely random based on quantum mechanics, and equipment or the like in which a device according to the invention of this application is incorporated is connected to a connection point (node) of an information communication network, thereby implementing a function of constantly shifting a sequence of identification numerical values that never overlap with those of another device (a sequence including identification numerical values). The device according to the present invention uses the sequence of shifting identification numerical values suitably as a foundation for determining the ID of the node. Management of an information communication network in which a node cannot be copied or impersonated is accomplished by performing access management of the information communication network with the use of the ID and the shifting identification numerical values.

Advantageous Effects of Invention

When a given piece of equipment is connected to an information communication network, it can be confirmed that the connected equipment is unique and genuine and is impossible to copy, and data that serves as the basis for the confirmation can be updated automatically each time a connection is made.

Digital data transmitted from a piece of equipment that is unique can be proved as genuine autonomously, without obtaining a certificate issued by a certificate authority.

BRIEF DESCRIPTION OF DRAWINGS

FIG. 9 is a diagram for illustrating attributes registered in a node, which is registered to a controller, in the system of FIG. 8.

FIG. 10 is an explanatory diagram for illustrating the operation of another example of the system to which the apparatus according to the present invention is applied.

FIG. 12A is an explanatory diagram for illustrating the operation of yet still another example of the system to which the apparatus according to the present invention is applied.

FIG. 12B is an explanatory diagram for illustrating the operation of FIG. 12A.

FIG. 13 is an explanatory diagram for illustrating the operation of FIG. 12A.

FIG. 14A is an explanatory diagram for illustrating the operation of FIG. 12A.

FIG. 14B is an explanatory diagram for illustrating the operation of FIG. 12A.

FIG. 15A is an explanatory diagram for illustrating the operation of FIG. 12A.

FIG. 15B is an explanatory diagram for illustrating the operation of FIG. 12A.

FIG. 16 is an explanatory diagram for illustrating the operation of FIG. 12A.

FIG. 20 is an explanatory diagram for illustrating the operation of FIG. 12A.

FIG. 21 is an explanatory diagram for illustrating the operation of FIG. 12A.

FIG. 22 is an explanatory diagram for illustrating the operation of FIG. 12A.

DESCRIPTION OF EMBODIMENTS

Apparatus for Attaining Uniqueness

An apparatus according to the invention of this application includes a pulse generation device and a memory. The pulse generation device includes an emitter, which includes a radioisotope (RI), and a detector. The isotope of the emitter has a number of atoms greater than the total number of identification targets. The detector detects α particles, β rays, and/or γ rays (hereinafter referred to as "α particles and others") emitted from the emitter due to spontaneous decay of an atomic nucleus to generate an electric pulse. The memory stores the number of pulses obtained by measuring, in advance, for a given period of time, electric pulses that are generated in the pulse generation device (hereinafter referred to as "initial pulse count"), the date of the measurement, and an identification numerical value obtained by digitizing a pulse interval between the electric pulses (hereinafter referred to as "initial identification numerical value").

When a given piece of equipment in which the apparatus according to the present invention is incorporated is connected to an information communication network, it is possible to confirm the fact that the connected equipment is unique and genuine and is impossible to copy. In other words, individual pieces of equipment can be identified. To that end, the pulse generation device of the apparatus according to the present invention is required to include a radioisotope that has a number of atoms greater than the total number of identification targets. Details are described below. In the following description, "device" refers to the apparatus according to the present invention, and also refers to the pulse generation device of the apparatus when the memory is not particularly necessary.

1) The Number of Atoms of a Radioisotope in a Device According to the Present Invention The following assumes that a device is incorporated in each identification target to assign a number (an identification numerical value) to the identification target by autonomous discrimination with the use of decay pulses of a radioisotope (RI).

Figure 1:
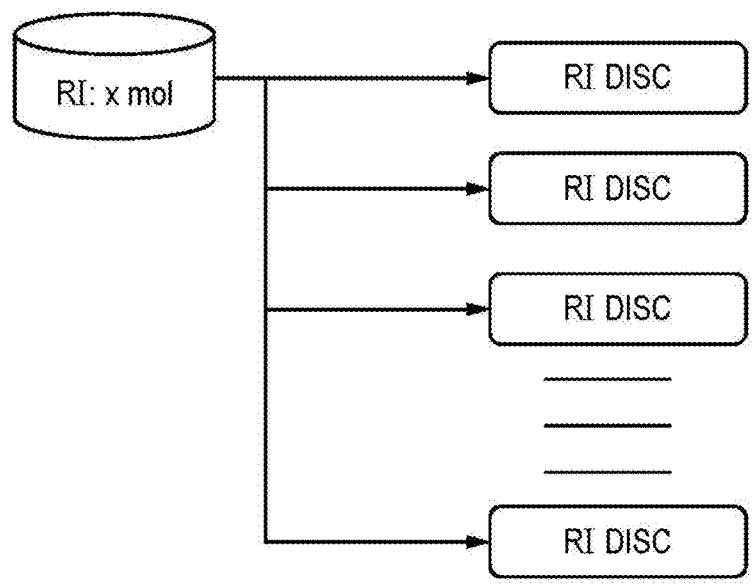
FIG. 1 is an explanatory diagram for illustrating the uniqueness of an apparatus according to the present invention.

A case is discussed in which the device is manufactured by dividing a base material (X mol) of a radioisotope (RI) that has $10^{24}$ atoms and that undergoes a decay into a trillion ($10^{12}$) discs (see FIG. 1). A trillion is the number of nodes (connection points) in the "Internet of things (IoT)", which is said to develop in the future. The number of atoms "$10^{24}$" is not out of the norm, considering that the number of atoms contained in 1 mol of element is supposed to be $6\times10^{23}$, which is the Avogadro constant.

Each of the discs manufactured by dividing the radioisotope (RI) contains approximately $10^{12}$ atoms. Although the number of atoms varies from one device manufactured as an actual product from another due to a manufacturing error, a simple assumption that each device contains a uniform number of atoms is adopted here.

When devices homogenous in terms of raw material have $10^{12}$ or more variations based on other physical properties, and the variations are measurable, each device manufactured from the same raw material can be identified as a unique entity, without employing such means as assigning serial numbers.

However, there is usually no way to measure variations caused by the numbers of atoms of the respective devices because means for measuring weight, for example, does not have the level of precision necessary to find out the number of atoms varying from one device to another.

When a radioisotope (RI) is used to manufacture devices, on the other hand, atoms of the raw material spontaneously decay to turn into a different element, and emit radiation rays in the process. The decay of each atom is a stochastic event based on the principle of quantum mechanics, for example, the tunnel effect, which makes the probability of decay of one atom constant in a unit time irrespective of the length of the observation period.

A system thereof is called a "Poisson random process" and does not have memory, which means that the probability per unit time is constant irrespective of past behavior. A probability dp at which one event occurs during an infinitesimal time dt is therefore λdt, where Δ represents a decay constant of the decay of the radioisotope. An average number of times the event occurs at a finite time interval T is simply ΔT. Atoms of each of the devices described above are accordingly independent of the whole and independent within the device as well, and can be considered as always having a possibility (entropy) of as many variations as the number of atoms contained in the device throughout the observation period.

Accordingly, $10^{12}$ devices manufactured from the same raw material each decay in a different pattern that varies depending on the number of atoms. It is therefore conceivable to individually identify devices each having $10^{12}$ or more atoms by different decay patterns of the devices.

The decay can be detected from an ionization effect brought about by the emission of a gamma ray or an α particle at the time of decay. When a nuclear species that emits only one α particle per decay and that never emits α particles again from a decayed atomic nucleus is selected instead of a nuclear species that emits two gamma rays simultaneously at the time of decay, the selected nuclear species can be used as devices that can be discriminated from one another without fail. In other words, no two atoms among $10^{12}$ atoms experience the decay of the same atomic nucleus, and each and every atom maintains its independence in decay.

From an opposite perspective, atoms of each device decay exponentially at a rate based on a decay coefficient and, when how many atoms decay in a given length of time is known, the number of atoms at that time can be estimated for each device from a decay exponent. With the number of atoms estimated, the total number (entropy) of decay pattern variations of the device can be estimated, and the possibility of identifying the device in each observation period can be determined.

As described above, a number N, which represents the number of atoms that decay in 1 second out of $N_0$ atoms is expressed with the use of the decay constant $\Delta$ by the following expression:

$$N = N_0 \times \lambda \quad (1)$$

From Expression (1), the original number of atoms can be obtained by the following expression:

$$N_0 = N/\lambda \quad (2)$$

In other words, when the number N of decays per second is measurable, the quotient of the number N divided by the decay constant can be estimated as the number of atoms at the time.

The emission of an α particle resulting from the decay of one atom can be detected by the detector for conversion into one electric pulse. The detector is means with which a change of one atom can be recognized macroscopically. The number of electric pulses can thus be treated as the number of decays.

When an electric pulse (decay) is counted at the detector, the number of atoms prior to the decay can be obtained by Expression (2). (The detection efficiency in this case is set to 100%. At a detection efficiency of 10%, the required number of decays is ten times larger.)

TABLE 1

The number of atomic nucleus decays (in 1 second) and the number of atoms prior to the decay

| Bq count | Number of $^{241}$Am atoms (atoms) | Number of $^{210}$Pb—$^{210}$Po atoms |
|---|---|---|
| 50 | 9.83187 × 10$^{12}$ | 5.072897 × 10$^{10}$ |
| 80 | 1.5731 × 10$^{12}$ | 8.116635 × 10$^{10}$ |
| 100 | 1.96637 × 10$^{12}$ | 1.014579 × 10$^{11}$ |
| 120 | 2.35965 × 10$^{12}$ | 1.217495 × 10$^{11}$ |
| 150 | 2.94956 × 10$^{12}$ | 1.521869 × 10$^{11}$ |
| 200 | 3.93275 × 10$^{12}$ | 2.029159 × 10$^{11}$ |
| 300 | 5.89912 × 10$^{12}$ | 3.043738 × 10$^{11}$ |
| 500 | 9.83187 × 10$^{12}$ | 5.072897 × 10$^{11}$ |
| 800 | 1.5731 × 10$^{13}$ | 8.116635 × 10$^{11}$ |
| 1,000 | 1.96637 × 10$^{13}$ | 1.014579 × 10$^{12}$ |
| 4,000 | 7.86549 × 10$^{13}$ | 4.058317 × 10$^{12}$ |

The decay constant of $^{241}$Am (half-life period: 432.2 years) is 5.08551×10$^{11}$ (seconds).

The decay constant of a $^{210}$Pb—$^{210}$Po radiative equilibrium substance (half-life period: 22.3 years) is 9.856302× 10$^{-10}$ (seconds).

In the case of Am, the number of Am atoms is 78 trillions when the Becquerel count is 4 kBq and, because the decay of each atom is a completely independent event, a trillion devices can be discriminated from one another by random numbers without duplicates. Similarly, when Am having a Becquerel count of 50 Bq is incorporated in a PUU, the number of Am atoms is 9.8 trillions, and it is understood that 10 billion PUUs can easily be discriminated from one another.

In this manner, a Bq count suitable for the scale of a network in which a product of interest is used may be selected by an optimum selection of Bq count for a substance to be incorporated in a PUU. It is understood that 10 PUUs can be discriminated from one another irrespective of whether the incorporated substance is $^{210}$Pb—$^{210}$Po having a half-life period of approximately 23 years, or a substance having an atomic weight at which the number of decays corresponds to 50 Bq.

Basically, devices having physical uncopiability (hereinafter referred to as "physically unclonable units: PUUs") can be manufactured by this method on the order of a trillion PUUs with ease.

To summarize, a device according to the present invention only needs to contain a number of atoms of a radioisotope (RI) that are equivalent to entropy exceeding the quantity of identification targets in order to identify (a huge quantity of) identification targets (that is, to attain uniqueness), and this fact can be verified by measuring for each device the amount of radiation emitted.

2) Method of Obtaining a Numerical Value for Device Identification by Pulse Measurement As described above, each device can be identified by the number of atoms contained in the device, and the number of atoms can be estimated by measuring the number of pulses of the device for a given length of time. However, the method of measuring the number of pulses by counting the sum total of pulses based on atomic nucleus decays as a way to identify a device takes long and is not efficient.

When the purpose of the measurement is to identify the uniqueness of a device, it is not always necessary to estimate the atomic weight of the radioisotope (RI) of each device with high precision. Assuming that the entropy is only required to be large enough to identify a difference between devices from the numbers of decays of the respective devices, the requirement is fulfilled by figuring out measurement means alternative to counting the number of pulses.

The entropy is an "information amount" and can be measured in units of bits. It is accordingly more efficient to extract an information amount necessary for the identification of a huge number of devices by a method alternative to measuring the number of pulses.

Fortunately, interval information about an interval between pulses of radiation emission caused by spontaneous decay seems to qualify as an alternative.

Specifically, a distribution function is derived first to represent a time interval between occurrence of one event at a time t=0 and generation of an immediate next pulse.

A probability of the next event occurring during the infinitesimal time dt, which is past the time t, is found out. This case means that no event occurs in a time interval from 0 to t and one event occurs in a subsequent period in which an increment of time equals the infinitesimal time dt. When the probability of decay (a decay constant) is given as A, the expression reads as follows:

$$I_1(t)dt = P(0) \times \Delta dt \quad (3)$$

The first term of the right side is a formula of radioactive decay, and directly conforms to the argument of the Poisson distribution. A probability at which no events occur during a length of time in which the number of recorded events is supposed to reach λt is obtained as follows:

$$P(0) = (\lambda t)^0 e^{-\lambda t}/0! = e^{-\lambda t} \quad (4)$$

Expression (4) is substituted in Expression (3) as follows:

$$I_1(t)dt = \lambda e^{-\lambda \times dt} \quad (5)$$

This is an exponential function representing how a pulse generation frequency, which is in relation to an increase of the interval, decreases at a rate based on the decay coefficient by natural logarithm power.

An average length of time is calculated by the following expression:

$$\bar{t} = \frac{\int_0^\infty tI_1(t)dt}{\int_0^\infty I_1(t)dt} = \frac{1}{\lambda} \quad (6)$$

In other words, the slope is the same as that of an exponential distribution corresponding to the reduction in the number of spontaneous decays.

The graph of the reduction in the number of decays and the graph of the distribution of intervals between generated pulses are thus expressed by the same equation strictly determined from only the number of atoms of a radioisotope (RI) and the decay coefficient of the RI. It can therefore be said that entropy for identifying the uniqueness of each device based on the spontaneous decay of a radioisotope (RI) is strictly included in pattern variations of the pulse generation interval of the respective devices.

Accordingly, when each device to be identified contains a number of atoms greater than the total number of identification target devices, the interval between pulses caused by the emission of a gamma ray, a beta ray, or an α particle due to the decay of an atomic nucleus is measured to be digitized as information, and the information can be used as an ID (an index for identification).

A case of α particles is described here. A similar method can be used to obtain a numerical value for identification also in the case of a measurement device that measures gamma rays or beta rays.

Specifically, α-particle decay can be converted by the detector into electric pulses and, by counting the interval between the electric pulses with the use of a frequency that serves as a reference, the interval can be quantified (quantized) from the count. The reference frequency is called a sampling frequency, and the clock frequency of a digital clock circuit is usually used as the sampling frequency.

In order to calculate entropy in the digitization of an interval between two pulses, it is logical to convert the interval into a binary number and evaluate the entropy in units of bits.

Specifically, when the interval between pulses is sectioned (quantized) into 256 sections in this measurement, the information amount is 8 bits. In this case, 256 devices at maximum can be identified. The maximum number of devices that can be identified with the use of bits obtained by quantization, and the probability of duplicates among identification numbers are calculated as shown in Table 2.

TABLE 2

Maximum generated numbers and a duplication probability in relation to the number of bits

| Number of pulses | Number of added bits | Maximum generated numbers | Duplication probability |
| --- | --- | --- | --- |
| 1 | 8 | 256 | 0.00390625 |
| 2 | 16 | 65,536 | $1.52588 \times 10^{-5}$ |
| 3 | 32 | 4,294,967,296 | $2.32831 \times 10^{-10}$ |
| 4 | 64 | $1.84467 \times 10^{19}$ | $5.42101 \times 10^{-20}$ |
| 5 | 128 | $3.40282 \times 10^{38}$ | $2.93874 \times 10^{-39}$ |
| 6 | 256 | $1.15792 \times 10^{77}$ | $8.63617 \times 10^{-78}$ |
| 7 | 512 | $1.3408 \times 10^{154}$ | $7.4583 \times 10^{-155}$ |

When the number of devices to be identified is $10^{12}$, the necessary information amount, which is the number of bits obtained by converting the number of identification targets into a binary number, is 40 bits ($2^{40}=1.0995\times10^{12}$). The probability of a phenomenon "duplication" in which the same value is assigned to two or more devices in this identification method is a reciprocal thereof: $9.0949\times10^{-13}$. It can therefore be considered that there are no duplicates when $10^{12}$ devices are identified.

As described above, pulse generation strictly conforms to quantum mechanics, and the information amount can consequently be increased by enhancing the precision of sampling in quantization so that an information amount of 40 bits is obtained with one pulse. However, quantization on the order of 8 bits is technically advisable in view of the stability of electronic circuits.

Addition to this 8 bits of information accordingly needs to be made by measuring a plurality of pulses to obtain 40 bits of information. From Table 2, four pulse intervals are required in this case, which means that five pulses are to be measured.

It is understood from this result that five pulses are sufficient for emission from atomic nuclei independent of one another. While a number of atoms at which five pulses are emitted are sufficient, the decay of each atomic nucleus is determined by the decay constant (may be regarded as decay probability), and the number of pulses expected to be detected is only a probability. It is therefore obvious that a number of atoms at which more than five pulses are generated within a length of time necessary for identification are required.

To summarize, a device is manufactured in which a radioisotope (RI) is loaded in the form of discs or a solution (the solution evaporates after dropped, leaving only metal atoms) into a detector, which has a function of outputting as an electric signal, and which includes a memory on which the result of measuring a pulse of the electric signal can be recorded.

After the device is manufactured, an electric pulse generated is measured, and an identification number (ID, identification numerical value) determined from the pulse in the manner described above is recorded on the memory provided in the device. With this method, each device manufactured from the same material is autonomously given uniqueness, and can be identified by an ID generated based on the uniqueness (the same applies to equipment or the like in which the device is incorporated).

In addition, the ID is recorded on the memory and this value in the memory can be known by remotely calling up the device. The device of the present invention thus allows remote confirmation that each device in an information communication network is unique (examples are described later).

3) Method of Checking the Continuation of Uniqueness by Digitizing Pulse Intervals at Different Time Points In the device of the previous item, an ID recorded on the memory is merely information, and whether the ID is a copy, a fake, or the original cannot be determined. The device therefore needs to have a function of preventing copying and faking in order to maintain the uniqueness of the device in an information communication network.

The uniqueness of a value that is obtained by digitizing the spontaneous decay of a radioisotope (RI) is not limited to the time of manufacture (likely to be the time of initial measurement in practice, the same applies to the following), and the probability given above is a probability of attaining uniqueness for every device at any time point in a utilization period of the devices when the same measurement time is obtained. In this case, however, a reduction in the number of pulses at a rate based on the decay constant needs to be taken into account. This adjustment can be made also by adjusting the sampling frequency instead of the pulse measurement time.

The device according to the invention of this application can accordingly obtain an ID different from that of another device and can be re-checked for uniqueness continuously and remotely by using a method of checking a numerical value that has the same uniqueness as at the time of manufacture, each time the device is connected to an information communication network. The copying and faking of the ID of the device can be prevented simultaneously by using this feature.

It is, however, illogical to record every numerical value sequence continuously. A method that is employed is to record an identification numerical value each time access is made. Specifically, the memory included in the device according to the present invention is provided with a recording area in which, besides an ID assigned at the time of manufacture, one other ID is similarly recorded, and the former and the latter are referred to as "factory default ID (initial identification numerical value)" and "current ID", respectively. The same items are also provided in a server that remotely calls up the device, in a reference table used to identify the device.

When a remotely located server or the like of the information communication network calls up the device of the present invention, the device records, as the "current ID", a current ID generated by measurement at the time of access, and the remote server, too, records, after checking the ID, the current ID as the same item in the table that is referred to for the device to be accessed.

The next time the device is accessed by the server, the server checks both the factory default ID and the "current ID" obtained the last time. The server confirms that the device is genuine when the factory default IDs match and the current IDs match.

The device side newly conducts measurement at the time of that access, and the resultant ID is used to update the "current ID". The server, too, obtains the resultant ID and updates its own table.

Repetitive execution of the processing described above gives every device a different value, thereby making it very difficult to match factory default IDs and match current IDs at the same time for someone who creates a copy of the device by accessing the device through illicit means and reading the two IDs (the "current ID" and the "factory default ID"), or by illicitly obtaining the two IDs through electrical interception of a communication path on which the two IDs are transmitted, someone who fakes the device by other means, and even someone who generates the "current ID" using the same product, and the uniqueness can thus be secured continuously.

Physically Unclonable Unit: PUU

1) An Example (Basic Mode) of a PUU

As described above, a device that cannot be copied physically is called a PUU, and the device according to the present invention is a PUU. In the following description, the device according to the present invention (the pulse generation device) has a basic mode of the PUU. The PUU is described here by taking as an example an apparatus in which α particles are used as a radiation source. The same description applies to apparatus that use gamma rays and apparatus that use beta rays.

When an information communication network in the era of "Internet of things (IoT)" is assumed to which household electric appliances and transportable equipment, for example, portable terminals, are connected, the PUU needs to be small in size to be incorporated in information communication equipment (node) connected to the network.

With the device according to the present invention, devices that can greatly be varied physically from one device to another and that are also small in size are provided. Discs or a solution can be used as an α particle emitter. Discs are manufactured commonly by a rolling method, which is rarely successful in making discs uniform and creates considerable fluctuations among discs. In the case of using a solution, metal α particles are often stirred into a solution, which is then dropped, and this method, too, causes fluctuations. In either case, α particles are used in a quantity that is less than the Basic Safety Standard (BSS) prescribed by the International Atomic Energy Agency (IAEA) and that does not make the discs or the solution a radiation source by the standard of IAEA. In the case of the PUU, the fluctuations contribute to the uniqueness of the device as well.

The detector containing a radioisotope (RI) is usually formed with the use of a plastic or ceramic carrier. In the case of using the solution, the manufacturing of the detector is compatible with a thin film process in which a plastic film serves as a carrier. A pulse generator using the thin film is markedly smaller in size and lower in power consumption than one using a plastic or ceramic carrier. In addition, when the solution is dropped by ink-jet or other similar methods, the production efficiency is raised and the manufacturing cost is markedly lowered.

Figure 2A:
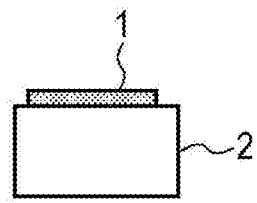
FIG. 2A is a sectional view for illustrating an example of the apparatus according to the present invention.

FIG. 2A is a sectional view for illustrating a basic mode of the PUU. In FIG. 2A, a disc containing a radioisotope (RI), which spontaneously decays to emit a radiation ray, for example, is formed as an emitter (disc) 1.

According to quantum mechanics, all atoms are independent of one another in the spontaneous decay of a radioisotope (RI), and the decay occurs as a purely mathematical probability event of an individual atom. However, the number of atoms is so enormous that a quantum mechanical phenomenon of an individual atom does not usually manifest itself externally.

On the other hand, the emission of radiation rays from a radioisotope (RI), which are detectable separately from one another with a GM tube, a Ge detector, a scintillation detector, a photodiode, a Si semiconductor, or the like, is a nuclear reaction, which generates a very large amount of energy and causes each and every particle to collide with an outer electron of an atom that forms a semiconductor device of the detector, with enough energy to make the detection semiconductor device generate a signal. A detector 2 of FIG. 2A includes a photodiode or a similar semiconductor device, and serves as a radiation ray detector with which a quantum mechanical event of each individual atom can be grasped macroscopically.

The PUU is manufactured so as to have specifications that increase fluctuations among pulse generation devices, for better conditions of device identification. Specifically, a radioisotope (RI) solution is dropped onto a photodiode, or an RI disc is loaded, in a manner that ultimately spreads the RI distribution wide or causes fluctuations in the incident angle of the radiation ray.

Figure 2B:
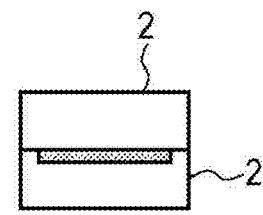
FIG. 2B is a sectional view for illustrating another example of the apparatus according to the present invention.
Figure 2C:
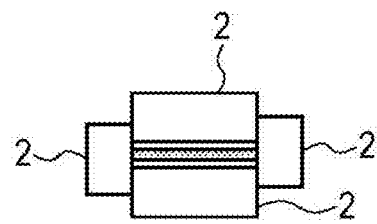
FIG. 2C is a sectional view for illustrating still another example of the apparatus according to the present invention.

There are structures that increase the number of pulses generated. The number of pulses doubles when the structure of FIG. 2B is employed. Substantially the entire quantity (100%) of α particles emitted from a disc-type emitter can be captured when the structure of FIG. 2C is employed.

Figure 2D:
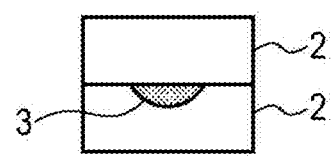
FIG. 2D is a sectional view for illustrating yet still another example of the apparatus according to the present invention.

Similarly, with the structure of FIG. 2D, which allows the use of an α emitter solution 3, 100% of α particles emitted from the emitter solution can be captured. In short, an emitter of less than 100 kBq (in the case of α particles), which is not regarded as a radiation ray by the standard of IAEA, is capable of generating 10K pulses/second at maximum. Two pulse generators generate 104 pulses×104 pulses=$10^8$ pulses and, in simulation or other occasions in which the generation of 1G=$10^9$ pulses/second is required, it is sufficient if three or more pulse generators are incorporated.

Figure 3A:
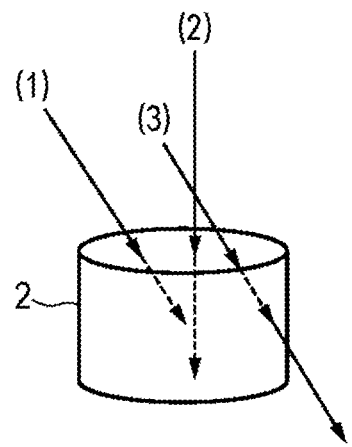
FIG. 3A is a diagram for illustrating how a particle enters a detector of the apparatus according to the present invention.
Figure 3B:
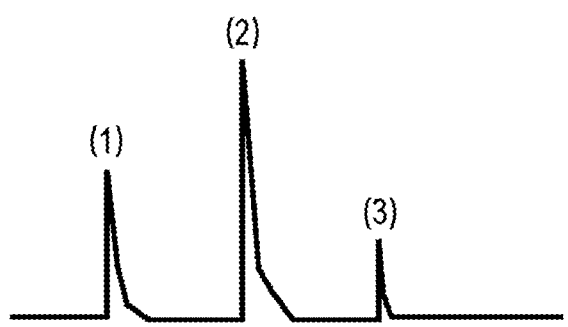
FIG. 3B is a diagram for illustrating an output waveform of the detector of FIG. 3A.

Inside the detector, an α particle collides with a semiconductor atom that forms the detector, thereby emitting electrons and losing energy, and stops or travels through. The emitted electron is observed as a pulse. The wave height of the pulse is determined by the path of the α particle (a reaction distance inside the semiconductor). When the α particle stops inside the detector, the entire energy (5.4 MeV) is released and the pulse wave height reaches the maximum. When the reaction distance is short, the pulse wave height is low as well. FIG. 3A is a diagram for illustrating a relation between the incident angle of an α particle entering the detector 2 and the pulse wave height. FIG. 3B is a diagram for illustrating the waveform of an output pulse of the detector. The output pulse has two elements, namely, "height (voltage)" and "interval", as illustrated in FIG. 3B.

The generation of α particles is random conforming to quantum mechanics, and the incident angle of an α particle is accordingly random as well, which makes the pulse wave height random as a result. A Bragg curve (not shown) is well known, which indicates a relation observed through long-term measurement between energy and the distance traveled by an α particle from a randomly decaying radioisotope (RI) till the α particle collides with air and stops. It is understood also from this phenomenon that the pulse wave height (energy) is distributed in a range that reaches the maximum energy.

2) ID Determination by the PUU

Pulses generated by the PUU are random in pulse interval, as well as in pulse wave height, with very high precision. Each numerical sequence that is an arrangement of numerical values obtained by measuring the interval between PUU-generated pulses at a fixed sampling (clock) frequency accordingly varies even when a given amount of radioisotope (RI) is loaded in every mass-produced PUU. Different IDs can be generated for as many as 1.0E+12 (a trillion) nodes by combining those properly. In order to facilitate the use of the numerical sequences as IDs, pulse intervals may be converted into uniform identification numerical values with the use of a function by utilizing the fact that pulse intervals (counted at the clock frequency) conform to the Poisson distribution.

Any number of bits, for example, 8 bits or 16 bits, can be used in the counting method that uses the sampling frequency (clocks). Depending on the speed of the clock, the counting may be started with 8 bits or 16 bits to add subsequently till any desired number of bits are reached. At present, a length of 128 bits or longer is regarded as appropriate for an identification numerical value used in encryption, in view of the calculation speeds of electronic computers used to decipher a code.

3) Means for Making the Total Number of Decay Pattern Variations of the PUU Large A pulse output from the pulse generation device used in the present invention has a form as the one illustrated in FIG. 3B. The height of this wave is known to be in proportion to the energy level of the reaction of a charged particle (here, an α particle) to the detection device. This waveform can be digitized by A/D conversion and digital conversion into a numerical value indicating the magnitude of the energy. This method is applied as MCA to a measurement method for finding out the nuclear species of a radioactive substance. The use of this method yields two completely independent identification numerical values, namely, the pulse interval and the wave height value, with one pulse. An example of the pulse generation device of the present invention generates pulses at approximately 80 cps (counts/second). When the number of pulses is 80 cps, 80 identification numerical values are obtained by pulse interval measurement and another set of 80 identification numerical values can be obtained at the same time by A/D conversion of the pulse wave height.

The pulses are each generated by an independent phenomenon and each resultant identification numerical value is accordingly independent as well. One pulse generation device can therefore generate 80×80 identification numerical values per second by combining an identification numerical value that is generated from the pulse wave height value and an identification numerical value that is generated from the pulse interval in a matrix as in Table 3.

While Table 3 has a matrix of 80×80 identification numerical values, the identification numerical values can be combined in any matrix, for example, a matrix of 10×10. The description given above is about a case in which one pulse generator is incorporated in one apparatus. Two, three, or more pulse generators may be incorporated in the same apparatus.

TABLE 3

Table 3 Identification Numerical Value Generation Matrix Table

| | Interval-based identification numerical value 1 | Interval-based identification numerical value 2 | Interval-based identification numerical value 3 | | Interval-based identification numerical value 78 | Interval-based identification numerical value 79 | Interval-based identification numerical value 80 |
|---|---|---|---|---|---|---|---|
| Wave height-based identification numerical value 1 | Identification numerical value 1-1 | Identification numerical value 1-2 | Identification numerical value 1-3 | ... | Identification numerical value 1-78 | Identification numerical value 1-79 | Identification numerical value 1-80 |
| Wave height-based identification numerical value 2 | Identification numerical value 2-1 | Identification numerical value 2-2 | Identification numerical value 2-3 | | Identification numerical value 2-78 | Identification numerical value 2-79 | Identification numerical value 2-80 |

TABLE 3-continued

Table 3 Identification Numerical Value Generation Matrix Table

|  | Interval-based identification numerical value 1 | Interval-based identification numerical value 2 | Interval-based identification numerical value 3 | Interval-based identification numerical value 78 | Interval-based identification numerical value 79 | Interval-based identification numerical value 80 |
|---|---|---|---|---|---|---|
| Wave height-based identification numerical value 3 | Identification numerical value 3-1 | Identification numerical value 3-2 | Identification numerical value 3-3 | Identification numerical value 3-78 | Identification numerical value 3-79 | Identification numerical value 3-80 |
| Wave height-based identification numerical value 78 | Identification numerical value 78-1 | Identification numerical value 78-2 | Identification numerical value 78-3 | Identification numerical value 78-78 | Identification numerical value 78-79 | Identification numerical value 78-80 |
| Wave height-based identification numerical value 79 | Identification numerical value 79-1 | Identification numerical value 79-2 | Identification numerical value 79-3 | Identification numerical value 79-78 | Identification numerical value 79-79 | Identification numerical value 79-80 |
| Wave height-based identification numerical value 80 | Identification numerical value 80-1 | Identification numerical value 80-2 | Identification numerical value 80-3 | Identification numerical value 80-78 | Identification numerical value 80-79 | Identification numerical value 80-80 |

The method of creating identification numerical values with the use of a matrix can employ (1) a circuit that simply connects identification numerical values (that puts a wave height-based identification numerical value after an interval-based identification numerical value), (2) a circuit that adds an interval-based identification numerical value and a wave height-based identification numerical value, (3) a circuit that multiplies one of an interval-based identification numerical value and a wave height-based identification numerical value by the other, (4) a circuit that creates an XOR of an interval-based identification numerical value and a wave height-based identification numerical value.

This method allows the identification numerical values to be combined in a multi-dimensional matrix in a similar manner even when a plurality of pulse generators are incorporated, and accordingly allows a necessary number of 5 mm-square, trial-product pulse generators incorporated in the same apparatus to be assembled as quick identification numerical value generators with ease in computer simulation or other cases in which a large number of identification numerical values are needed in a short length of time.

Figure 4:
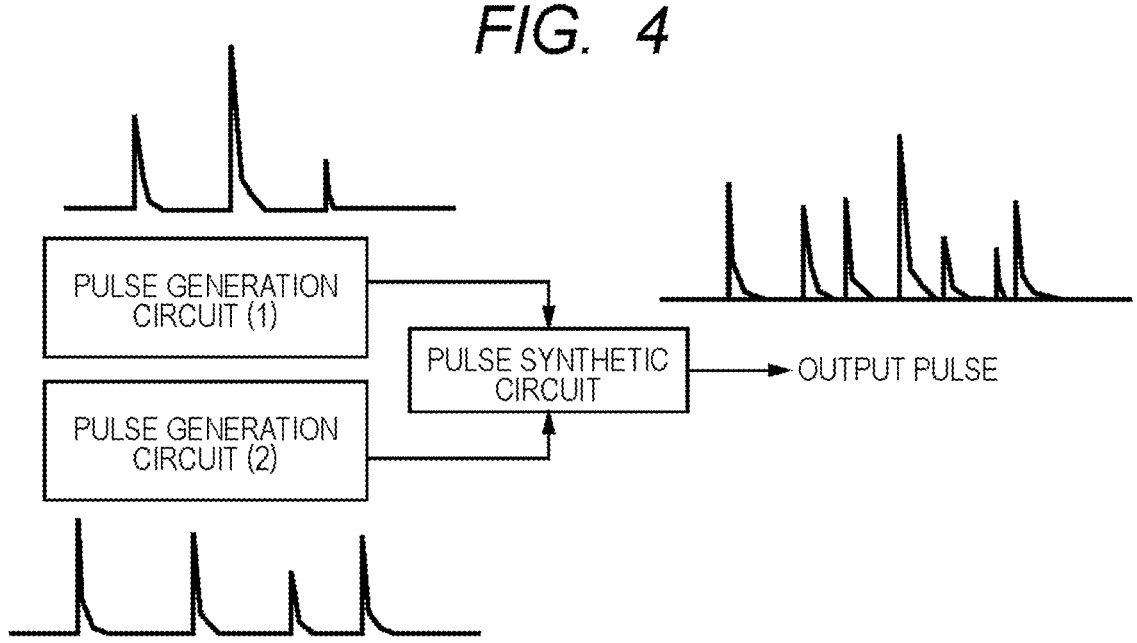
FIG. 4 is a block diagram for illustrating a circuit configuration for the case of using a plurality of apparatus according to the present invention.

A circuit configuration that is employed in the case of incorporating a plurality of pulse generation devices is illustrated in FIG. 4. Pulses generated in generation circuits (1) and (2) of a plurality of pulse generation devices are input to a pulse synthetic circuit, from which a synthesized pulse is output. The interval between synthesized pulses can be counted with use of clocks to be output as an identification numerical value.

Figure 5A:
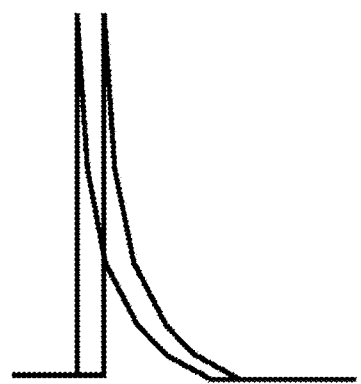
FIG. 5A is a diagram for illustrating the waveforms of pre-synthesis pulses close to each other.
Figure 5B:
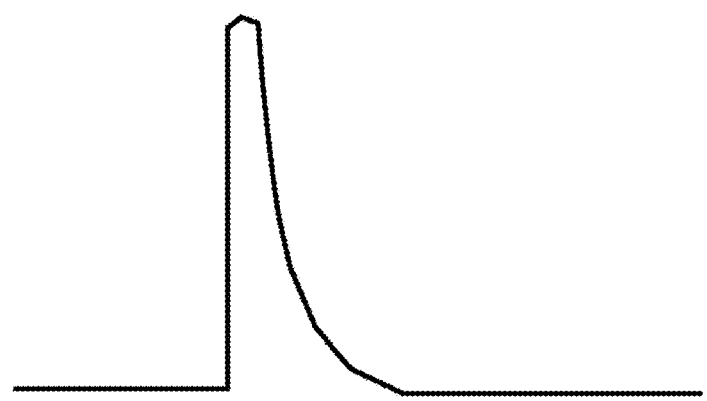
FIG. 5B is a diagram for illustrating the waveform of an output pulse that is created by synthesizing the pulses of FIG. 5A.

What is important to know regarding the synthetic circuit is that, when the clock pulse used has a low frequency (resolution) (when the clock pulse interval is long), and the interval between pulses is close, two synthesized pulses are counted as a double peak as if the two pulses were one pulse. Specifically, when peaks overlap as illustrated in FIG. 5A, the pulses are observed as one pulse as in FIG. 5B.

Figure 6:
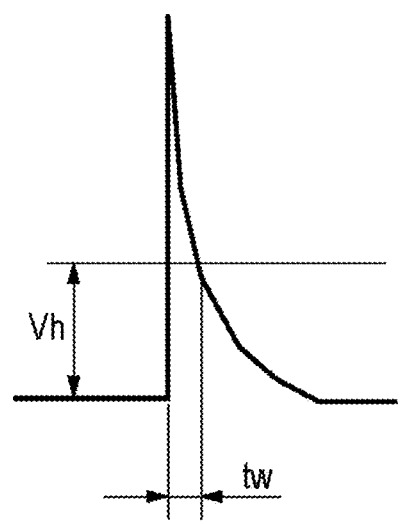
FIG. 6 is an explanatory diagram for illustrating a method of determining a double peak of a pulse in the apparatus according to the present invention.

To determine a double peak, a measurement voltage Vh of a single normal pulse is determined and a pulse width tw at that point is determined as illustrated in FIG. 6. An observed pulse that exceeds tw is determined as a double peak and excluded. The values Vh and tw are uniquely determined by a circuit constant. The exclusion of a double peak does not affect the role of the number of clocks, which is measured in the section in which the exclusion takes place, as an identification numerical value.

In the manner described above, a numerical sequence (identification numerical values) that serves as a basis for determining a unique ID for every device can be derived from the interval and heights of electric pulses generated by α particles from a radioisotope (RI) due to spontaneous decay. This numerical sequence shifts in a manner different in every device, based on the principle of quantum mechanics, and cannot be predicted or reproduced. The numerical sequence is also stable and is not changed by temperature/pressure and electromagnetic waves. This has much greater advantages to methods of the related art in which the ID of a node is fixed to a number assigned by software that uses a given algorithm, a number assigned through arrangements at the time of manufacture, or the like, and can be predicted or reproduced.

Assuming that a device of this much high performance is to be assembled from an electronic circuit with the use of thermal noise or other sources of randomness, the scale and the cost are considerable and the randomness needs to be statistically assayed as well. Stability, aging, and the like, too, need to be taken into consideration in the manufacturing of the circuit. Products of the related art are in fact burdened with those requirements.

The apparatus according to the present invention accomplishes far greater performance only with a small amount of radioisotope (RI), a detector, and an amplifier at low cost, which makes the apparatus highly useful.

4) Another Example (Application Mode) of the PUU

Figure 7:
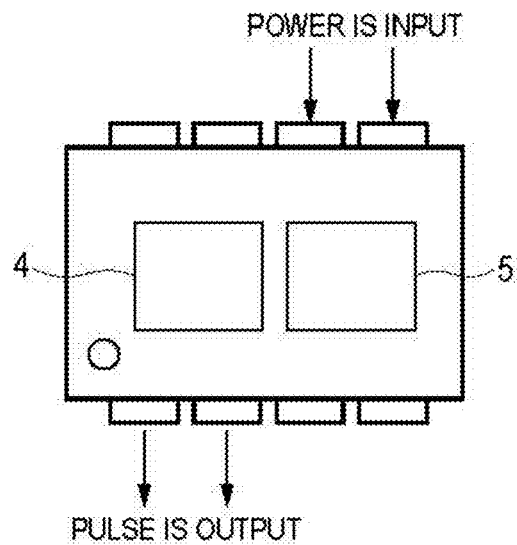
FIG. 7 is a plan view for illustrating an example of a device to which the apparatus according to the present invention is applied.

FIG. 7 is a diagram for illustrating an example of an application mode of the PUU. The illustrated PUU includes a pulse generation device 4 and a memory 5, and is of a model that does not include a power source. It is preferred to give the illustrated PUU the form of a chip (or of a tag) for the ease of handling (hereinafter referred to as "Qtag").

This model can be made inexpensive by mass production, and allows only the identification of a device.

The numerical values necessary to prove uniqueness that are described above, for example, a factory default identification (ID) (an initial identification numerical value) and the number of pulses, are recorded in the memory. The PUU is used in combination with another piece of equipment, and power is accordingly supplied from external equipment to the PUU. The PUU of this model only outputs pulses, and external equipment handles all others, including the measurement of the energy distribution of the PUU in operation and the measurement of the pulse interval.

In still another example of the PUU of the present invention, the PUU is structured so as to convert and shape an output pulse from the pulse generation device into an identification numerical value, and to output the identification numerical value.

Irrespective of whether the PUU has the basic mode or the application mode, the uniqueness of the PUU can be converted into a form operable as digital data that can easily be handled by information communication equipment, by taking out an electric pulse and converting the electric pulse into an arbitrary identification numerical value, and is thus applicable to information networks.

Other examples of the PUU of the present invention include one in which the PUU of the present invention is mounted to, built in, or constructed unitarily with an IC card, an NFC device, or the like that has a short-range wireless communication function, one in which the PUU of the present invention and a PIC, MPU, or a similar semiconductor chip are mounted to, built in, or constructed unitarily with a communication unit that has an authentication function (may be a unit having a mode similar to that of a USB). Those examples are described when a description on utilization modes of the PUU is given later.

Utilization Modes of the PUU

I. Identification and Authentication of Equipment (Terminals and Nodes) and Information in a Network 1) Equipment Identification A network has a sender and a receiver, which necessitates the confirmation of the uniqueness of equipment in the network by the other party. The confirmation in this case involves identification and authentication of the equipment. Equipment identification is to check whether or not equipment connected to a network has uniqueness, with the use of an ID number having uniqueness and assigned to the equipment. When the PUU of the present invention is mounted to a piece of equipment, an identification numerical value generated at the time when the PUU is manufactured (at the time of initial measurement) can be used as the ID of the piece of equipment. With other methods of assigning a number, software is used and absolute uniqueness is consequently not guaranteed. The uniqueness of the PUU of the present invention originates from a radioisotope (RI) itself, and even a device that simply outputs an electric pulse (a pulse generation device) can be treated as a PUU by externally processing the signal of the electric pulse with software.

2) Equipment Authentication

"Authentication" is to acknowledge that an identified piece of equipment has uniqueness in the network, does not have its copies, and is genuine and not impersonating. For that purpose, a characteristic of the PUU that the identification numerical value sequence, which is continuously generated, shifts to have a different value every time can be utilized. This is carried out specifically by, for example, replacing an identification numerical value each time access is made over the network, because putting the entire identification numerical value sequence into use is impractical, recording the replacement identification numerical value as a key, and checking the key the next time access is made. A specific example is described later.

The device thus cannot be copied or impersonated merely by imitating a momentary state through the copying of an access record of one point in time.

A network has a sender and a receiver as described above, and the PUU of the present invention can also be used by the sender and the receiver to confirm that the sender and the receiver are both unique. In this case, the PUU is provided in each of the sender and the receiver. An identification numerical value generated in the sender and an identification numerical value generated in the receiver not only serve as keys for granting each other access, but also encrypt and decrypt exchanged keys, which gives this method very high efficiency and security compared to other methods. A specific example is described later.

3) Information (Digital Data) Authentication (Prevention of Data Leakage, Copying, and Tampering)

The PUU of the present invention does not generate the same value as an identification numerical value generated at one time point (including the initial identification numerical value) at other time points. The theft of digital data is therefore prevented just by embedding a generated identification numerical value (for example, through encryption by XOR). In order to prevent tampering after encryption, a hash value of the original digital data and a hash value of the identification numerical value are obtained as well.

The identification numerical value is embedded in the digital data with the use of XOR for the sake of convenience. Methods of performing XOR include one in which the digital data is encrypted in order with the use of a 128-bit identification numerical value or a 256-bit identification numerical value (any number of bits can be set), and Vernam cipher in which the digital data is encrypted with the use of an identification number having the same length as the block length of the digital data. An example of the PUU of the present invention generates identification numerical values that are based on pulse interval measurement at a rate of 80 identification numerical values/second, and is accordingly compatible with Vernam cipher in such cases as when a person is typing words on a word processor. The PUU is capable of generating identification numerical values necessary for Vernam cipher in the length of time spent on typing on a word processor, and can consequently convert writing into undecipherable codes in real time.

The identification numerical value used here is generated from a pulse that is generated in an atomic nucleus spontaneously decayed at a time tn, which is past t0, in Expression (7) given below (an expression that indicates a change with time of the number of atoms of a radioisotope having the decay constant λ), and contains the time stamp of the time tn. However, the time tn is not explicitly given, and the identification numerical value used here is accordingly treated as a way to prevent tampering without being regarded as containing time.

II. Time Stamp Authentication Using the PUU

1) Elapsed Time Measurement Based on the Number of Pulses and Decay Constant of Radioactive Substance The number of atoms at the time t is given as N(t). Each radioisotope has a unique decay constant, which is defined so that the number of atoms decreases from N(t) atoms at the elapse of $\Delta t$ seconds by $\lambda N(t)\Delta t$ atoms. In other words, the following are established:

$$\Delta N = N(t+\Delta) - N(t) = -\lambda N(t)\Delta t$$

$$\Delta N/\Delta t = -\lambda N(t)$$

A limit in the case of $\Delta t \to 0$ is calculated to obtain the following differential equation:

$$dN/dt = -\lambda N(t)$$

The solution of the differential equation is $N(0)=N_0$ when $t=0$, and the following is therefore established:

$$N(t) = N_0 e^{-\lambda t}$$

This is the expression that indicates a change with time of the number of atoms of a radioisotope having the decay constant $\lambda$. The number of atoms is in proportion to the number of radiation rays emitted at that time, and can accordingly be estimated by measuring the number of radiation rays generated (the number of pulses, or the count).

The count in a time period $0 \to t$ is expressed by the expression given below. This calculation takes into account damping due to the decay of atomic nuclei as well.

$$N_{(0-t)} = \int_0^t N_0 e^{-\lambda t} dt = N_0 \int_0^t e^{-\lambda t} dt = \quad (7)$$

$$N_0 \left[-\frac{1}{\lambda} e^{-\lambda t}\right]_0^t = \frac{N_0}{\lambda}(-e^{-\lambda t} - (-1)) = \frac{N_0}{\lambda} = \frac{N_0}{\lambda}(1-e^{-\lambda t})$$

However, the decay of radioactive substance fluctuates. While the fluctuation is what makes the generation of the genuine identification numerical value described above possible, the fluctuation manifests as an error in measurement for estimating the elapsed time. A measurement error of the measurement value is expressed by the following expression:

$$n \pm \sigma = \frac{N}{t} \pm \frac{\sqrt{N}}{t} = n \pm \sqrt{\frac{n}{t}} \quad (8)$$

For instance, the average count is 80 counts/second in an example of the PUU (pulse generation device) of the present invention. Table given below holds numerical values obtained when no atomic nucleus decays during the measurement time. Based on this, measurement errors in long-term measurement are as shown in the following table:

TABLE 4

|  | Second | Count | • (count) |
|---|---|---|---|
|  | 10 | 800 | 2.82843 |
| 1 minute | 60 | 4,800 | 1.1547 |
| 2 minutes | 120 | 9,600 | 0.8165 |
| 1 hour | 3,600 | 288,000 | 0.14907 |
| 1 day | 86,400 | 6,912,000 | 0.03043 |

TABLE 4-continued

|  | Second | Count | • (count) |
|---|---|---|---|
| 30 days | 3E+06 | 2.07E+08 | 0.00556 |
| 6 months | 2E+07 | 1.24E+09 | 0.00227 |
| 1 year | 3E+07 | 2.52E+09 | 0.00159 |
| 3 years | 9E+07 | 7.57E+09 | 0.00092 |

According to Table 4, the measurement error in measurement that lasts an hour or longer is less than 0.15 count, and the basis for accurate elapsed time can be obtained. It is also seen from Table 4 that the measurement time needs to be at least 2 minutes in order to reduce the error to 1 count or less. When the count is obtained by measurement and the elapsed time till measurement is determined with the use of Expression (7), the accuracy is 2 minutes for one hour or so of measurement.

An example of the PUU of the present invention can thus estimate the time elapsed since the manufacture of the apparatus at an accuracy of 2 minutes by measuring the number of electric pulses for an hour, for example.

This means that the apparatus according to the present invention can estimate the time of measurement autonomously, without relying on an outside time authority, or a GPS radio wave signal or other signals, when the date and time of manufacture (the date and time of initial measurement) are electromagnetically recorded in the apparatus, by using the recorded date and time.

The required precision of synchronization in network processing such as time stamping is usually on the order of seconds. In social uses, on the other hand, certification of date is often precise enough.

It is also understood from Table 4 that the pulse measurement time required to obtain a given precision depends on the intensity of a radiation ray from the radiation source. The necessary pulse measurement time can accordingly be shortened significantly by raising the radiation capture ratio as in FIG. 2B and FIG. 2B, or by increasing the amount of radioactive substance within the range of regulations of IAEA.

An internal clock device (real-time clock: RTC) is built in most pieces of information communication equipment from design necessity. An autonomous time stamp authentication function well suited for practical uses is accomplished by combining the autonomous time stamp authentication function of the apparatus according to the present invention with a detailed time management function of the RTC.

The description given above is condensed to as follows:

(1) Quantum Timekeeping (QTK) Function

In the present invention, a fixed amount of radioisotope (RI) is incorporated in a PUU to be used. Radiation from the isotope characteristically diminishes gradually because atoms of the radiation source decrease in number with time. The amount of radioisotope (RI) does not increase after the PUU is manufactured, which means that the amount of radiation can indicate the length of time elapsed since the time of manufacture (the time of initial measurement).

The PUU (including a pulse generation device) of the present invention has a time management function (timekeeping function) capable of measuring an elapsed time with output pulses, which is called quantum timekeeping (QTK). "Quantum" refers to the fact that this timekeeping function is dependent on quantum mechanical characteristics of the output pulses output from the PUU.

(2) Elapsed Time Measurement

The PUU of the present invention is capable of keeping track of the decay of the contained radioisotope (RI) with output electric pulses, and can consequently estimate the elapsed time just by finding out the initial value of the number of pulses at the time of manufacture and the current number of pulses, without the trouble of measuring an object by a mass spectrograph as in radiocarbon dating or other troubles. However, pulse generation is fluctuated, which makes the precision of estimating the elapsed time dependent on the length of time for measuring the number of pulses.

2) Consideration to Damage of the Detection Unit Diode from a Particle Irradiation In the PUU of the present invention, damage to the diode is started when the diode is irradiated with an α particle. The damage from the irradiation is unavoidable because the detection of an α particle is made by directly measuring an electron that is pushed out as a result of the damage. When Si atoms in the diode are depleted, α particles can no longer be detected, that is, the diode arrives at the end of its "lifetime".

In an example of the PUU (pulse generation device) of the present invention, the pulse generation device measures 0.67 mm-square and pulses generated at 80 cps are measured. It takes 3.2 years to reach $1.2 \times 10^{12}/cm^2$ in this case. This time frame fits with the demanded length of set lifetime (the time till the apparatus becomes automatically unusable), which is usually 2 years for internet bank authentication apparatus and the like.

In the case of deterioration, a reduction in count rate becomes greater than the measurement error. It can be determined that deterioration has started when a test reveals that the reduction is greater than the measurement error in an hour of measurement. The use of the PUU needs to end at the expiration of a given valid period, which is set in advance, when the PUU is used for time stamp authentication described later.

3) Application of the Quantum Timekeeping (QTK) Function to Time Stamp Authentication In the present invention, a time point can be estimated by QTK from the length of time elapsed since the time of manufacture. By electronic signature that uses an identification numerical value derived from a pulse in which this time point information is contained, and a hash value calculated for data to be transferred over a network, the certification of the time stamp of the transferred data and the detection of tampering are accomplished. In other words, whereas the functions of outside certificate authorities are required for time stamping and electronic signature, the present invention is capable of warranting the time point and data reliability with the uniqueness of the PUU and the QTK function. Timestamping is accordingly accomplished autonomously in the present invention, without outside help.

Remarkable effects can therefore be expected. For example, in the case of transaction data (the readings of an electric power meter, rental fees for a self-driving automobile, or the like), which serves as the basis of an electronic commerce transaction, the time stamp of the transaction data and the specifics of the transaction can be warranted efficiently at low cost by adding the initial pulse value (initial identification numerical value) at the time of manufacture of the PUU that is connected to a node in which the data has been generated, and the number of pulses at the time of transaction, to information about the specifics of the transaction such as "when", "who", "what", and "how much".

The time stamp authentication function of the PUU can also be utilized for the authentication of digital data (document data and the like). To store digital data explicitly including the time of creation of the digital data, what has been practiced is to store, along with the digital data, a time point according to an outside time authority when connection to the Internet is available, or a time point according to GPS in the case of mobile equipment, or time point data of the built-in RTC when the former two are not available. However, the time point according to an outside time authority, the time point according to GPS, and the time point data of the RTC can be tampered by the creator of the document.

Time stamp authentication data provided by the PUU, on the other hand, cannot be tampered even by the creator of the document, and the genuineness (uniqueness) of explicit time point data in the present invention is therefore warranted with data generated by the PUU. Examples are described later.

III. Identification and Authentication of Equipment (Terminals and Nodes) in a Network and Digital Data, Based on Identification Numerical Values Themselves that are Generated by the PUU In the description given in "I. Identification and Authentication of Equipment (Terminals and Nodes) and Information in a Network", the physically unclonable unit (PUU) of the present invention is mounted to each piece of equipment to generate an identification numerical value that shifts in a manner different from one PUU to another, and the identification numerical value is managed continuously. Aside from this method, equipment (terminals and nodes) and information (digital data) can be identified and authenticated (including time stamp authentication) with identification numerical values themselves that are generated by the PUU of the present invention.

In an example of the PUU of the present invention described below, only α particles emitted in a spherical direction and entering a semiconductor that has a certain area are measured as radiation. The pulse generation device of this PUU uses an Am-241 disc having a diameter of 2.381 mmn (3/32 inches), and made of Ag and Au. The thermal expansion coefficient of the disc is 14.2E-6/° C. (20° C.) for Au, 19.7E-6/° C. (20° C.) for Ag, and 2.8-7.3E-6/° C. (20° C.) for Si. Even when the temperature rises by 50° C., a change in area that affects measurement at 80 cps is about 1/1,000, and it can be inferred that there is no change in the number of pulses measured. As to the radiation source strength, on the other hand, the precision at the time of manufacture is 4.0 kBq±15%, fluctuating between 3.6 kBq and 4.6 kBq. The radiation source strength is surmised to have a normal probability distribution, in which case the Bq count after manufacture varies for each.

An example of how the identification and authentication of equipment (node) in a network and information (digital data) based on an identification numerical value itself are conducted with the use of this PUU is described below.

First, authentication of a transmission-side terminal, which transmits digital data, is conducted as follows:

The transmission-side terminal encrypts the measured "current pulse count" (containing a time stamp as a key) and a hash value of the digital data with an initial identification numerical value registered in the PUU, and transmits the encrypted current pulse count and the encrypted hash value to the management side (reception-side terminal). The management side (reception terminal) records the time (date/ time) of reception of the encrypted data, and decrypts the received data with the initial identification numerical value, which is registered on the management side in advance, to obtain the "current pulse count".

The date/time of manufacture (the time of initial measurement) of the PUU mounted to the transmission-side terminal, and the number of pulses at the time of manufacture of the PUU (the initial pulse count), are registered on the memory within the PUU, and the pieces of data are also registered on the management side (reception-side terminal) in advance.

The length of time elapsed since the time of manufacture (the time of initial measurement) can be estimated from the decrypted current pulse count, the initial pulse count registered on the management side in advance, and the decay constant of the radioisotope (a known value), based on the inverse operation formula described above. With the date/time of manufacture recorded on the reception side in advance, the time of measurement of the "current pulse count" can be estimated by adding the estimated elapsed time to the recorded date/time of manufacture. The estimated time of measurement is checked against the recorded time of reception of the encrypted data. When it is determined that the estimated time matches the recorded time, the time stamp (including the date of manufacture and other pieces of time point data) is successfully authenticated, and the fact that the received digital data has been transmitted from a genuine node is confirmed at the same time. In other words, the transmission-side terminal is successfully authenticated.

The transmission terminal calculates the hash value of the digital data (information), encrypts the calculated hash value with the initial identification numerical value registered in the PUU, and transmits the encrypted hash value along with the digital data to the management side (reception-side terminal) (to conduct time stamp authentication, the current pulse count measured by the transmission terminal is also encrypted to be transmitted to the management side (reception terminal) along with the hash value of the digital data).

The management side (reception terminal) first calculates a hash value of the received digital data, and decrypts the received encrypted hash value with the initial identification numerical value registered in advance. When the calculated hash value and the decrypted hash value match, it is determined that the digital data has not been tampered or leaked. In other words, the digital data is successfully authenticated.

Details of this authentication are described in examples given below.

As described above, normal electronic signature, which uses a public encryption key, requires an outside certificate authority, and time stamping generally needs an outside time authority that transmits accurate time and a time stamp authority that can be used to externally verify that the time stamp has not been tampered. Time stamp certification and the confirmation of an electronic signature cannot be executed without involving those outside services.

In contrast, a system according to the present invention is capable of executing verification on all functions given below for a component of an information communication network, without accessing the outside, based on the fact that the reliability of a key is secured with hash calculation and an encryption technology that use a genuine identification numerical value.

(1) Who: The PUU is installed in each node to warrant the uniqueness of the node based on the physical uncopiability of the PUU. (2) When: The time stamp is warranted from the fact that the elapsed time can be calculated backwards from the number of pulses at the time of manufacture (the time of initial measurement), which is stored in the PUU, and the current number of pulses (containing a time stamp). (3) What: Whether digital data has been tampered (information authentication) can be verified by checking a hash value of digital data to be certified against a hash value of data that is obtained through decryption of the time stamp information.

Data generated in each individual node is given three assets, 1) genuineness (uniqueness), 2) time of generation, and 3) detection of tampering and leakage, at once by the PUU of the present invention.

IV. Application of the PUU to a Network System

Embodiment 1

Figure 8:
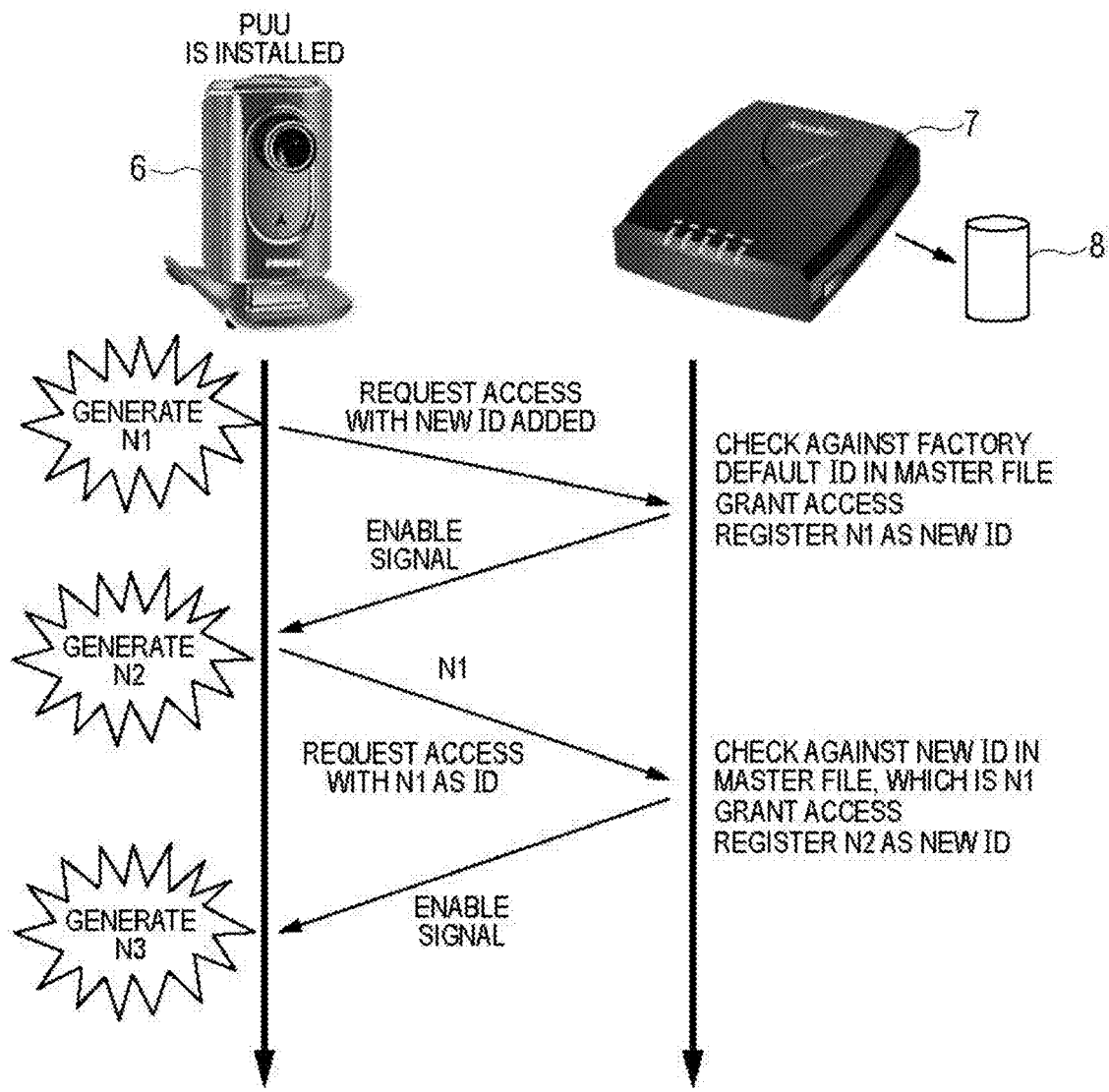
FIG. 8 is an explanatory diagram for illustrating the operation of an example of a system to which the apparatus according to the present invention is applied.

FIG. 8 is a diagram for illustrating an example of a system in which the PUU is mounted to equipment (a sensor node) 6 in a sensor network. The system of this example controls access of the sensor node based on the PUU's identification numerical value, which shifts in a manner unique to the PUU.

In FIG. 8, the sensor node represents user (client)-side equipment (a Web camera in the illustrated case), terminal (PC), or the like, which is connected to the network, and a controller 7 represents management (server)-side equipment, terminal, or the like, which is connected to the network as well.

The PUU is mounted to the sensor node. The ID (initial identification numerical value) of the PUU at the time of manufacture (the time of initial measurement) of the PUU is registered in advance in a master file 8, or a reference table or the like, of the controller. The controller has an attribute record as the one illustrated in FIG. 9 for each node to manage access of each node.

The PUU autonomously generates an identification numerical value that has uniqueness based on quantum mechanics, and can accordingly be assigned a number based on the identification numerical value. Individual nodes can be discriminated by writing the assigned numerical value (a random number) in the memory. However, a numerical value as this can be copied and the genuineness (uniqueness) of the numerical value cannot be verified remotely over a network.

On the other hand, the PUU continuously generates an identification numerical value, which leads to a characteristic in that PUUs built in or externally connected to all nodes in the network can constantly generate identification numerical values that keep changing differently from one another.

The genuineness (uniqueness) of each individual node can accordingly be maintained remotely by using the ever-shifting identification numerical value as a warrant for the genuineness (uniqueness) of the node and controlling access to the network with the identification numerical value. Steps of checking the genuineness (uniqueness) are described with reference to FIG. 8.

Steps of checking the genuineness (uniqueness) of equipment (node) in a network are as follows:

(1) When accessing for the first time, the sensor node sends, to the controller, a newly generated ID (identification numerical value, the same applies to the following) (N1) (a current ID) in addition to a factory default ID (an initial identification numerical value).

(2) The controller grants the sensor node access when the factory default ID sent from the node matches a factory default ID registered in the controller. The controller also registers the sent new ID (N1) as the current ID of this node (updates with the new ID (N1)).

(3) When accessing next time, the sensor node sends, to the controller, a newly generated ID (N2) (a new ID) in addition to the current ID (the ID (N1) newly generated in the last access)).

(4) The controller grants the sensor node access when the current ID sent from the node matches a current ID registered in the controller. The controller also registers the sent new ID (N2) as the current ID of this node (updates with the new ID (N2)).

In the network processing described above, as described above, each transmitted/received identification numerical value of the PUU is unique to a particular sensor node, and does not overlap with identification numerical values sent from other nodes in the network. Access control in which uniqueness is warranted is accordingly achieved by sequentially recording and checking the shifting identification numerical value sequence.

(5) The same steps are repeated from then on.

Embodiment 2

FIG. 10 is a diagram for illustrating an example of a system in which a PUU is mounted to each of a terminal (sensor node) and a server (controller). The terminal (sensor node) represents, as in Embodiment 1, user (client)-side equipment connected to a network, and the server (controller) represents management (server)-side (or another user-side) equipment, which is connected to the network as well. The PUUs used here are of a type that has a built-in APG (pulse generation device), shapes a pulse into identification numerical value (random number) data, and outputs the identification numerical value data (the type is called a Micro Quantum Random Number Generator: MQRNG).

Steps of authenticating genuineness (uniqueness) in the illustrated example are as follows:

(1) A common key K1 is registered in advance on the terminal side and the server side both. Alternatively, an identification numerical value T1 (a random number) generated by the terminal-side PUU is registered on the server side in advance, and an identification numerical value S1 (a random number) generated by the server-side PUU is registered on the terminal side in advance.

(2) Authentication of the terminal is conducted first. When accessing for the first time, the terminal side encrypts (by XOR operation) the common key K1 or the identification numerical value T1 with an identification numerical value T2 (a random number), which is generated on the terminal side, encrypts (by XOR operation) the identification numerical value S1 with the generated identification numerical value T2, and transmits the pieces of encrypted data to the server side. The server side decrypts the former received encrypted data with the common key K1 or the identification numerical value T1 on hand by XOR calculation to obtain the identification numerical value T2. The server side uses the obtained identification numerical value T2 to perform XOR operation on the latter encrypted data, thereby obtaining the identification numerical value S1. The terminal is successfully authenticated by checking the obtained identification numerical value S1 against the identification numerical value S1 that is registered in advance on the server side, and confirming a match. The server side also records the obtained identification numerical value T2 as a key.

(3) Authentication of the server is conducted next. The server side encrypts (by XOR operation) the identification numerical value T1 and the identification numerical value T2 registered as a key with an identification numerical value S2 (a random number), which is newly generated on the server side, and transmits the pieces of encrypted data to the terminal side. The terminal side decrypts the former received encrypted data with the identification numerical value T1 on hand by XOR calculation to obtain the identification numerical value S2. The terminal side uses the obtained identification numerical value S2 to perform XOR operation on the latter encrypted data, thereby obtaining the identification numerical value T2. The terminal is successfully authenticated by checking the obtained identification numerical value T2 against the identification numerical value T2 on the terminal side, and confirming a match. The terminal side also records the obtained identification numerical value T2 as a key.

(4) In the next and subsequent access, the terminal side and the server side alternatingly generate a new identification numerical value and perform encryption with the identification numerical value of the last time, and the terminal side and the server side exchange the encrypted data with each other.

(5) When the key of the last time can be confirmed by using the identification numerical value of the last time as a key, the terminal side and the server side each transmit its own new identification numerical value, with the received identification numerical value as a new key.

In Embodiment 1, a PUU is built in the sensor node, which is a terminal, and an identification numerical value generated in the terminal is exchanged as it is in a plain text format. In Embodiment 2, an external PUU is installed in each of a terminal and a server, which are two end points of a network, and the terminal and the server each execute additional encryption processing in which XOR operation is performed on a generated identification numerical value and on an identification numerical value generated in the last access (a common key in the case of the first access). By incorporating the PUU of the present invention in the client and the server each, genuineness (uniqueness) is warranted, and the client and the server cannot be impersonated by emulation in which communication steps are simply copied, or by creating a snapshot-like copy. In addition, a "real-time, man-in-the-middle, attack" can be detected in which a third party breaks into the communication line to pass itself as the server and obtain ID data illicitly, and impersonates the terminal to make illicit access, because authentication of the server can be conducted as well on the terminal side. Efficient communication is also accomplished in Embodiment 2, in which encryption/decryption only requires using the XOR command once, and no complicate processing.

In Embodiment 2 also, each transmitted/received identification numerical value of a PUU is unique to a particular sensor node, and does not overlap with identification numerical values sent from other nodes in the network. Access control in which uniqueness is warranted for both end points of a network is accordingly achieved by sequentially recording and checking the shifting identification numerical value sequences at both end points.

When the opposite is the case and access is denied despite the fact that the sensor node is operating normally, the possibility of this node being impersonated can be detected.

In Embodiments 1 and 2 and subsequent embodiments, CRC or other known technologies can be used in combination for an error in a communication line and an error in a master file.

Embodiment 3

Figure 11:
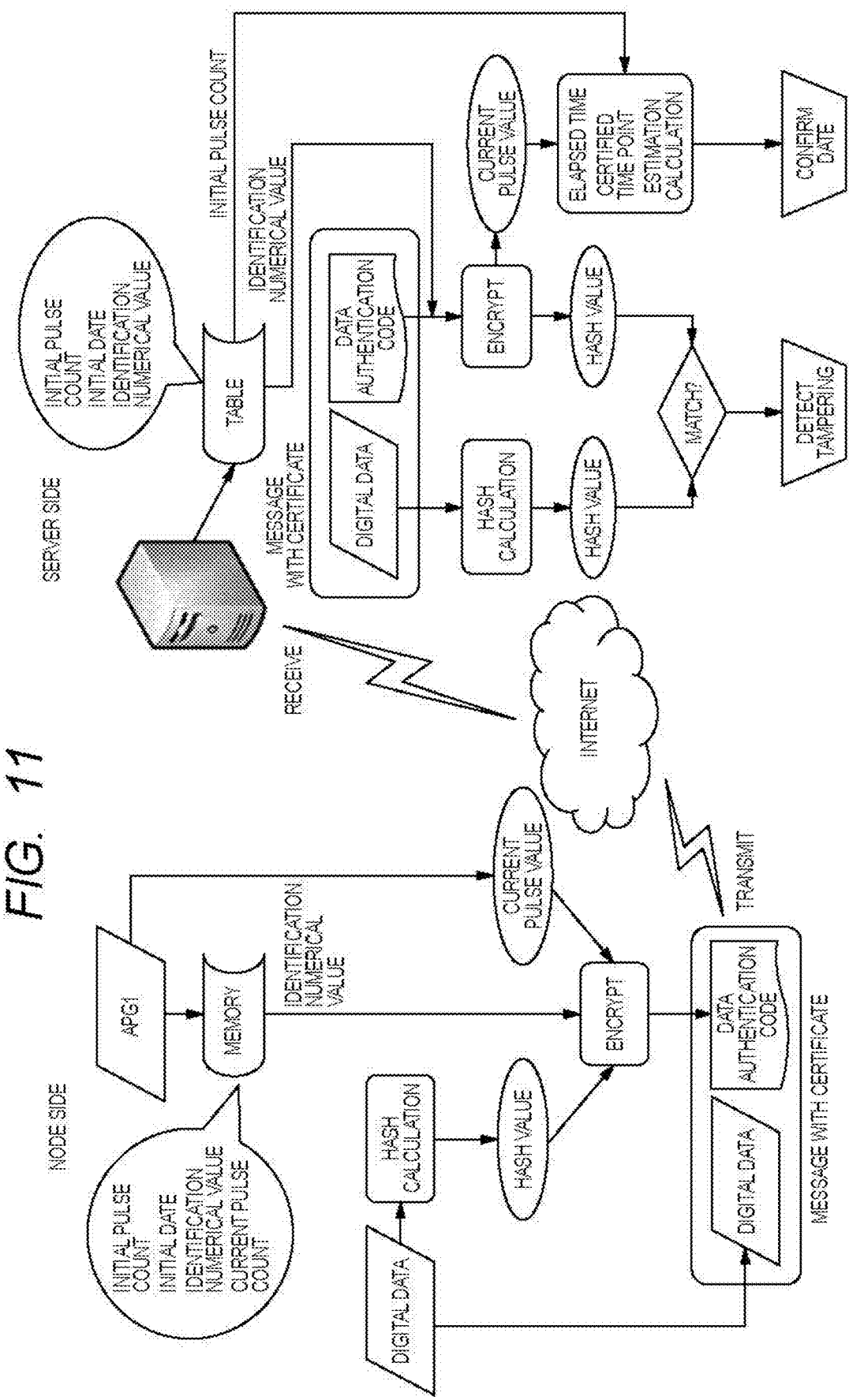
FIG. 11 is an explanatory diagram for illustrating the operation of still another example of the system to which the apparatus according to the present invention is applied.

FIG. 11 is a diagram for illustrating another example of the system in which a PUU is mounted to a sensor node. Time stamp authentication, too, is conducted in Embodiment 3. The node side records, on a memory (including the memory of the PUU), the initial number of pulses (the number of pulses at the time of initial measurement, an initial pulse count), an initial date (the date of initial measurement), an identification numerical value (initial identification numerical value), and the current number of pulses. The server side registers, in advance, the initial number of pulses, the initial date, and the identification number in association with the node, in a master file, a reference table, or the like.

In the system of the illustrated example, a "hash value" having a fixed length is calculated by a hash function with the use of a usual technology (an identification numerical value can be used as a seed of this function), because it is inefficient to process digital data that is to be certified as it is. The calculated hash value is encrypted with an identification numerical value (a random number) to generate a "data authentication code". The generated data authentication code is transmitted along with the digital data (the "message with a certificate" in FIG. 11). The digital data can separately be encrypted with an identification numerical value. In the illustrated example, the current pulse value is also transmitted by being encrypted into the "data identification code" together with the hash value, for the purpose of time stamping.

The reception side receives the "message with a certificate", records the date/time of reception, and calculates a hash value of the digital data first by the same calculation method that is used on the transmission side (the calculated value is referred to as "hash value A"). The reception side decrypts the digital data with an identification numerical value when the data is encrypted data, thereby returning the digital data to plain text.

The reception side next decrypts the "data authentication code" with the transmission-side identification numerical value recorded in a table or the like to obtain a hash value of the digital data (the decrypted code is referred to as "hash value B") and the current number of pulses.

The hash value A and the hash value B are then compared. When the two do not match, it is determined that the digital data has been tampered on its way to the reception side. The comparison between the current pulse count obtained by decryption and the initial pulse count recorded in the table also enables the reception side to estimate the length of time elapsed since the time of manufacture of the PUU, which means that time stamp authentication can be executed in the manner described in "III. Identification and Authentication of Equipment (Terminals and Nodes) in a Network and Digital Data, Based on Identification Numerical Values Themselves That are Generated by the PUU". In other words, the fact that the digital data has been issued by a genuine node (the transmission-side terminal) can be confirmed.

While the PUU is used in Embodiment 3 to accomplish authentication (prevention of tampering and leakage) of digital data and time stamp authentication, the identification of the transmission side, or of the transmission side and the reception side, through an exchange and update of identification numerical values as in Embodiment 1 or Embodiment 2 may be conducted additionally.

A specific description is given on a difference between the method of authenticating transmission-side digital data with the use of the PUU (or pulse generation device) of the present invention and the usual certification method, which uses a certificate authority (CA) and a time stamp authority (TSA).

(1) Method Using a CA and a TSA

A) Certification can be obtained with respect to whether or not data has been tampered by a third party, not the creator of the data, and with respect to the time stamp.

B) Denial prevention is made possible. A private key certified by a third party is used for encryption, which means that no one other than the sender can encrypt. The sender therefore cannot deny the fact that the transmission has been executed by the sender.

(2) Method Using the PUU

A) This method does not use an outside CA and an outside TSA, and accordingly involves no third-party certification. The method is capable of certifying the sender without third-party certification because the PUU of the sender has uniqueness.

B) An identification numerical value is sent to the receiver in advance, and not contained in a message with a certificate. Tampering of the identification numerical value and the hash value both as an attempt to circumvent determination about whether data has been tampered on the way therefore does not work.

C) In time stamping, too, the date cannot be falsified by altering the number of pulses on the way, because the initial pulse count is not contained in the message.

D) The sender uses an identification numerical value having uniqueness in encryption, and consequently cannot deny the fact of transmission by the sender.

E) Altering of data by persons other than the receiver is prevented, which gives the method a function sufficient for the communication of technical data as in a Controller Area Network (CAN) of a vehicle (the purpose is to prevent external disruption).

Embodiment 4

FIGS. 12 to 22 are diagrams for illustrating an example of a system in which the PUU of the present invention is mounted to each of a transmission-side terminal (node or equipment) connected to a network and a reception-side terminal (node or equipment) to transmit and receive information (digital data). The PUU in Embodiment 4 contains a radioisotope of which the number of atoms is well larger than the total number of identification targets (the total number of devices (pulse generation devices or PUUs)+the total number of communication sessions throughout a period in which the transmission side and the reception side use communication). The distinction between the transmission side and the reception side is made for convenience and, in the case of two-way communication, each terminal, which is capable of transmission and reception, can be the transmission-side terminal and the reception-side terminal both.

The illustrated system is capable of not only identification and authentication of each terminal but also authentication of information (digital data) transmitted/received between the terminals, by using the PUU of the present invention. In the present invention, an identification numerical value generated by the PUU for each session is used as an encryption key (common key), thereby eliminating a calculation load that is incurred when a public key is obtained by calculation. Safe and secure communication is also accomplished with the present invention in which the transmission side and the reception side exchange and update identification numerical values (encryption keys) for each session.

Encryption and decryption are achieved just by XOR, and accordingly require no existing encryption algorithm.

Terminal identification and authentication and information authentication are described in detail below by following the illustrated example.

The transmission-side terminal and the reception-side terminal each register, in advance, in its memory (may be a memory built in the terminal or the memory built in the PUU), an identification code of its own (transmission side P1), a common key (K1), and an identification code of the party at the other end of the communication (reception side P2). An example given here is a case in which the transmission side and the reception side hold those pieces of data in a table format as illustrated in FIG. 12A (transmission side) and FIG. 12B (reception side). The identification code of each terminal can be expressed by the initial identification numerical value of the PUU.

<Authentication of the Other Party Terminal>

The transmission-side terminal first encrypts (by XOR operation), as illustrated in FIG. 13, its own identification code (P1) in the table of FIG. 12A with an identification numerical value (CA1) (referred to as "communication identification numerical value") generated by the PUU of the transmission-side terminal, to thereby generate an encrypted mutual identification numerical value (RA1). The transmission-side terminal also generates an encrypted communication identification numerical value (CCA1) by performing XOR operation on the common key (K1) with the use of the identification numerical value (CA1). The encrypted mutual identification numerical value (RA1) and the encrypted communication identification numerical value (CCA1) are transmitted to the reception-side terminal.

The reception-side terminal decrypts, as illustrated in FIG. 14A, the received encrypted communication identification numerical value (CCA1) with the common key (K1) through XOR operation, thereby obtaining a communication identification numerical value (CA1') of the transmission side. A symbol with "' (a prime)" indicates that the value has been decrypted. The reception-side terminal also performs XOR operation on the encrypted mutual identification numerical value (RA1) with the use of the obtained communication identification numerical value (CA'), thereby obtaining an identification code (P1'). When the transmission-side terminal is a genuine terminal, the common key of the transmission-side terminal and the common key of the reception-side terminal are the same common key (K1). Then, the communication identification numerical value (CA1') decrypted on the reception-side terminal is equal to the communication identification numerical value (CA1), and the identification code (P1'), which is obtained by decrypting the identification code (RA1) with the communication identification numerical value (CA1'), is equal to the identification code (P1) as well. When the transmission-side terminal is not a genuine terminal, the decrypted code and the recorded code differ from each other.

At this point, the reception-side terminal uses its PUU to automatically generate a new identification numerical value, and sets the generated value as a communication identification numerical value (CB1). The reception-side terminal then creates a "mutual communication code" in which the decrypted identification code (P1') of the other party, the decrypted communication identification numerical value (CA1') of the other party, and its own communication identification numerical value (CB1) are aligned as illustrated in FIG. 14B.

The reception-side terminal next generates, as illustrated in FIG. 15A, an encrypted mutual identification numerical value (RB1) by performing XOR operation on its own identification code (P2) in the table of FIG. 12B with the use of the communication identification numerical value (CB1) in the same manner that is used on the transmission side. The reception-side terminal also generates an encrypted communication identification numerical value (CCB1) by performing XOR operation on the common key (K1) with the use of the communication identification numerical value (CB1). The encrypted mutual identification numerical value (RB1) and the encrypted communication identification numerical value (CCB1) are transmitted to the transmission-side terminal.

The transmission-side terminal decrypts, as illustrated in FIG. 15B, the received encrypted communication identification numerical value (CCB1) with the common key (K1) through XOR operation in the same manner that is used on the reception side, thereby obtaining a communication identification numerical value (CB1') of the reception side. The transmission-side terminal also performs XOR operation on the encrypted mutual identification numerical value (RB1) with the use of the obtained communication identification numerical value (CB1'), thereby obtaining an identification code (P2'). In the same manner that is used on the reception side, the transmission-side terminal generates a "mutual communication code" in which the decrypted identification code (P2') of the other party (reception side), the decrypted communication identification numerical value (CB1') of the other party, and its own communication identification numerical value (CA1) are aligned as illustrated in FIG. 16. When the reception-side terminal is a genuine terminal, the common key of the transmission-side terminal and the common key of the reception-side terminal are the same common key (K1). Then, the communication identification numerical value (CB1') decrypted on the transmission-side terminal is equal to the communication identification numerical value (CB1), and the identification code (P2'), which is obtained by decrypting the identification code (RB1) with the communication identification numerical value (CB1'), is equal to the identification code (P2) as well. When the reception-side terminal is not a genuine terminal, the decrypted code and the recorded code differ from each other.

<Key Exchange>

Figure 17:
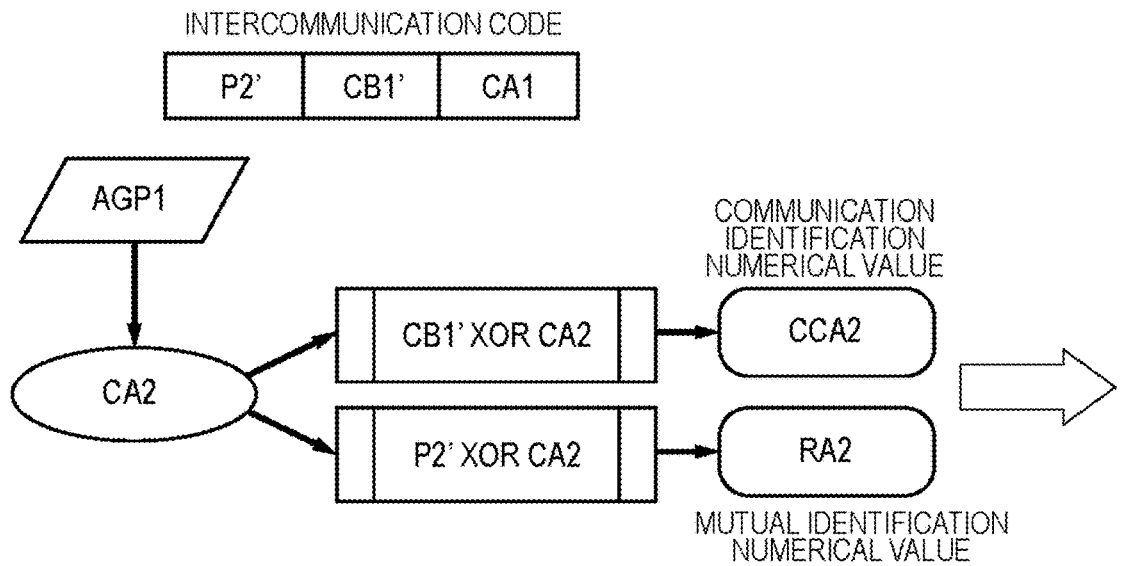
FIG. 17 is an explanatory diagram for illustrating the operation of FIG. 12A.

When communication to/from the other party (reception-side terminal) is to be newly held, the transmission-side terminal first generates automatically a new communication identification numerical value (CA2) in the PUU of the transmission-side terminal and, as illustrated in FIG. 17, generates an encrypted new communication identification numerical value (CCA2) and an encrypted identification code (RA2) by performing XOR operation on the communication identification numerical value (CB1') of the other party terminal and the decrypted identification code (P2') of the reception side, respectively, which are in the mutual communication code (FIG. 16) for communication to the other party. The generated communication identification numerical value and the generated identification code are transmitted to the other party. The mutual communication code for communication to the other party that is used at this point is the one created in the immediately preceding <other party terminal authentication>.

The reception-side terminal decrypts the received encrypted communication identification numerical value (CCA2) by performing XOR operation with the use of its own communication identification numerical value (CB1) located in its own mutual communication code (FIG. 14B).

Figure 18:
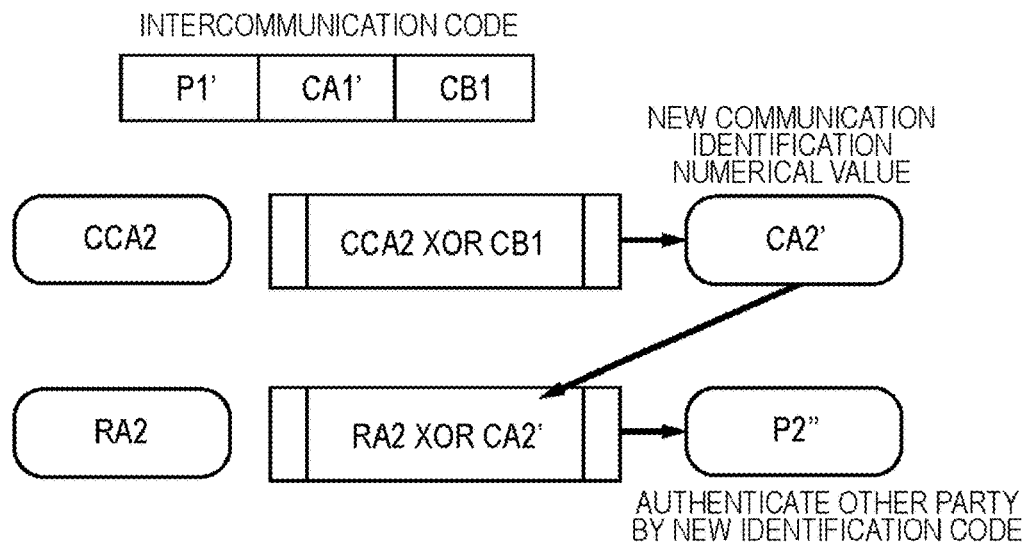
FIG. 18 is an explanatory diagram for illustrating the operation of FIG. 12A.
Figure 19:
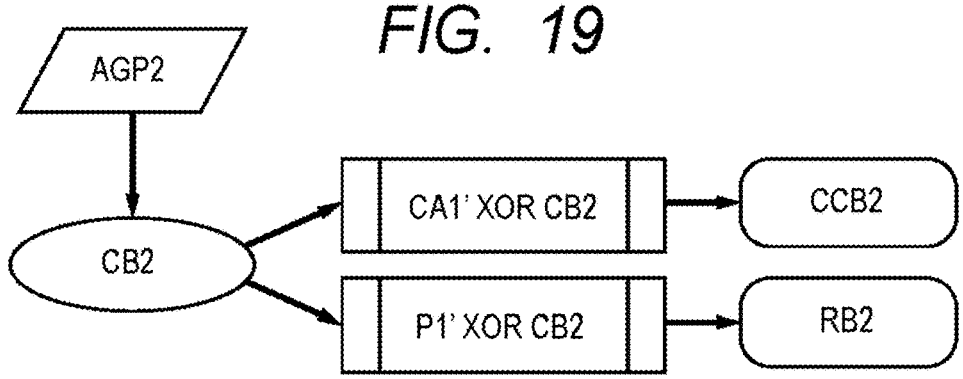
FIG. 19 is an explanatory diagram for illustrating the operation of FIG. 12A.

A decrypted communication identification numerical value (CA2') of the other party is thus obtained (see FIG. 18).

The reception-side terminal further performs XOR operation on the received encrypted identification code (RA2) with the use of the decrypted communication identification numerical value (CA2') of the other party terminal, thereby obtaining its own (the reception-side terminal) decrypted identification code (P2"). The reception-side terminal compares the decrypted identification code (P2") to its own identification code (P2). When the transmission-side terminal is genuine, the communication identification numerical value (CB1') decrypted on the transmission-side terminal is equal to the communication identification numerical value (CB1), and the communication identification numerical value (CA2') decrypted on the reception-side terminal is accordingly equal to the communication identification numerical value (CA2). This makes the identification code (P2"), which is obtained by decrypting the identification code (RA2) with the communication identification numerical value (CA2'), equal to the identification code (P2'), which is encrypted with the communication identification numerical value (CA2). The decrypted identification code (P2') is equal to the identification code (P2) when the transmission-side terminal is genuine as described above, which makes the identification code (P2") equal to the identification code (P2). When the transmission-side terminal is not a genuine terminal, the decrypted code and the recorded code differ from each other. The fact that the transmission-side terminal is a genuine and unique terminal can accordingly be confirmed when a comparison between the identification code (P2") and the identification code (P2) reveals that the two match (see FIG. 18).

The reception-side terminal also uses its own PUU to automatically generate a communication identification numerical value (CB2) as in the transmission-side terminal, and generates an encrypted new communication identification numerical value (CCB2) and an encrypted identification code (RB2) by performing XOR operation on the communication identification number (CA1') of the other party terminal and the decrypted identification code (P1') of the transmission side, respectively, which are in the mutual communication code (FIG. 14B), with the use of the new communication identification numerical value (CB2). The generated communication identification numerical value and the generated identification code are transmitted to the transmission side (see FIG. 19).

Once the transmission-side terminal is confirmed as a genuine terminal, the reception-side terminal updates the decrypted communication identification numerical value of the other party terminal from (CA1') to (CA2'), and updates its own communication identification numerical value from (CB1) to (CB2) in the mutual communication code for communication to the other party as illustrated in FIG. 20.

Next, the transmission-side terminal receives the encrypted communication identification numerical value (CCB2), and obtains a decrypted communication identification numerical value (CB2') of the reception-side terminal by performing, in the same manner that is used on the reception side, XOR operation with the use of its own communication identification number (CA1), which is located in the mutual communication code (FIG. 16) for communication to the other party.

The reception-side terminal further performs XOR operation on the received encrypted identification code (RB2) with the use of the decrypted communication identification numerical value (CB2') of the other party terminal, thereby obtaining its own (the reception-side terminal) decrypted identification code (P1"). The transmission-side terminal compares the decrypted identification code (P1") to its own identification code (P1) and, when the two match, confirms that the reception-side terminal is a genuine and unique terminal.

Once the reception-side terminal is confirmed as a genuine terminal, the transmission-side terminal updates the decrypted communication identification numerical value of the other party terminal from (CB1') to (CB2'), and updates its own communication identification numerical value from (CA1) to (CA2) in the mutual communication code for communication to the other party as illustrated in FIG. 21.

In the subsequent session, the identification numerical value (CB2', . . . ) as the updated transmission-side encryption key and the identification numerical value (CA2', . . . ) as the updated reception-side encryption key are used in place of the common key (K1) to encrypt identification numerical values newly generated on the transmission-side terminal and the reception-side terminal separately. The transmission-side terminal and the reception-side terminal each send the encrypted identification numerical values to the other party terminal, and then exchange encryption keys in the manner described above in the item <Key Exchange>.

<Data Communication>

After the transmission-side terminal and the reception-side terminal are authenticated and exchange encryption keys, the transmission-side terminal encrypts digital data as information with the identification numerical value (CA2) generated on the transmission-side terminal during the encryption key exchange (CA2 is recorded in the "mutual communication code" of the transmission side), and sends the encrypted digital data to the reception-side terminal. The reception-side terminal decrypts the received encrypted digital data with the identification numerical value (CA2') registered as an encryption key during the encryption key exchange (CA2' is recorded in the "mutual communication code" of the reception side) (see FIG. 22).

Figure 30A:
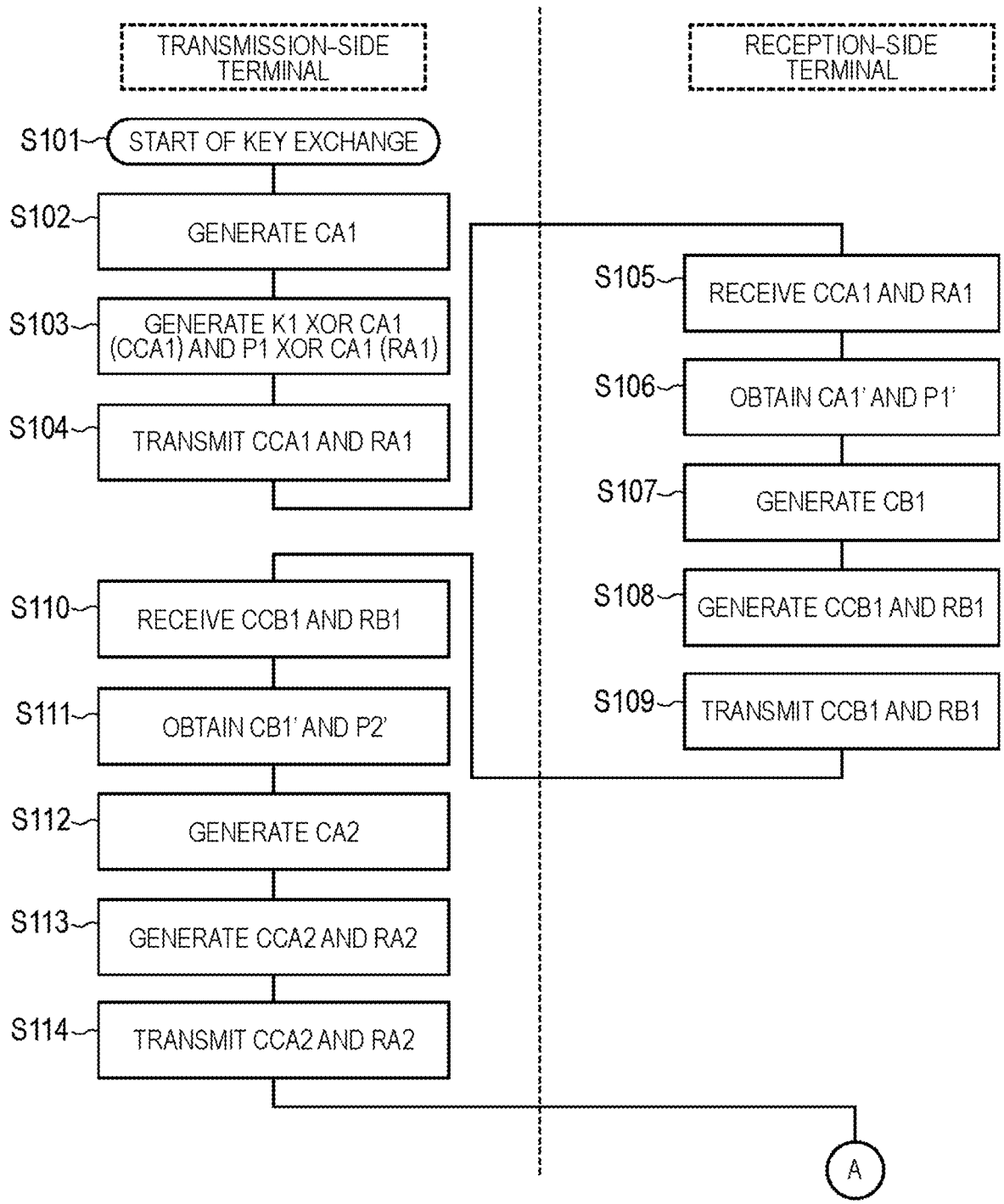
FIG. 30A is a flow chart for illustrating a key exchange operation executed in Embodiment 4 by the system to which the apparatus according to the present invention is applied.
Figure 30B:
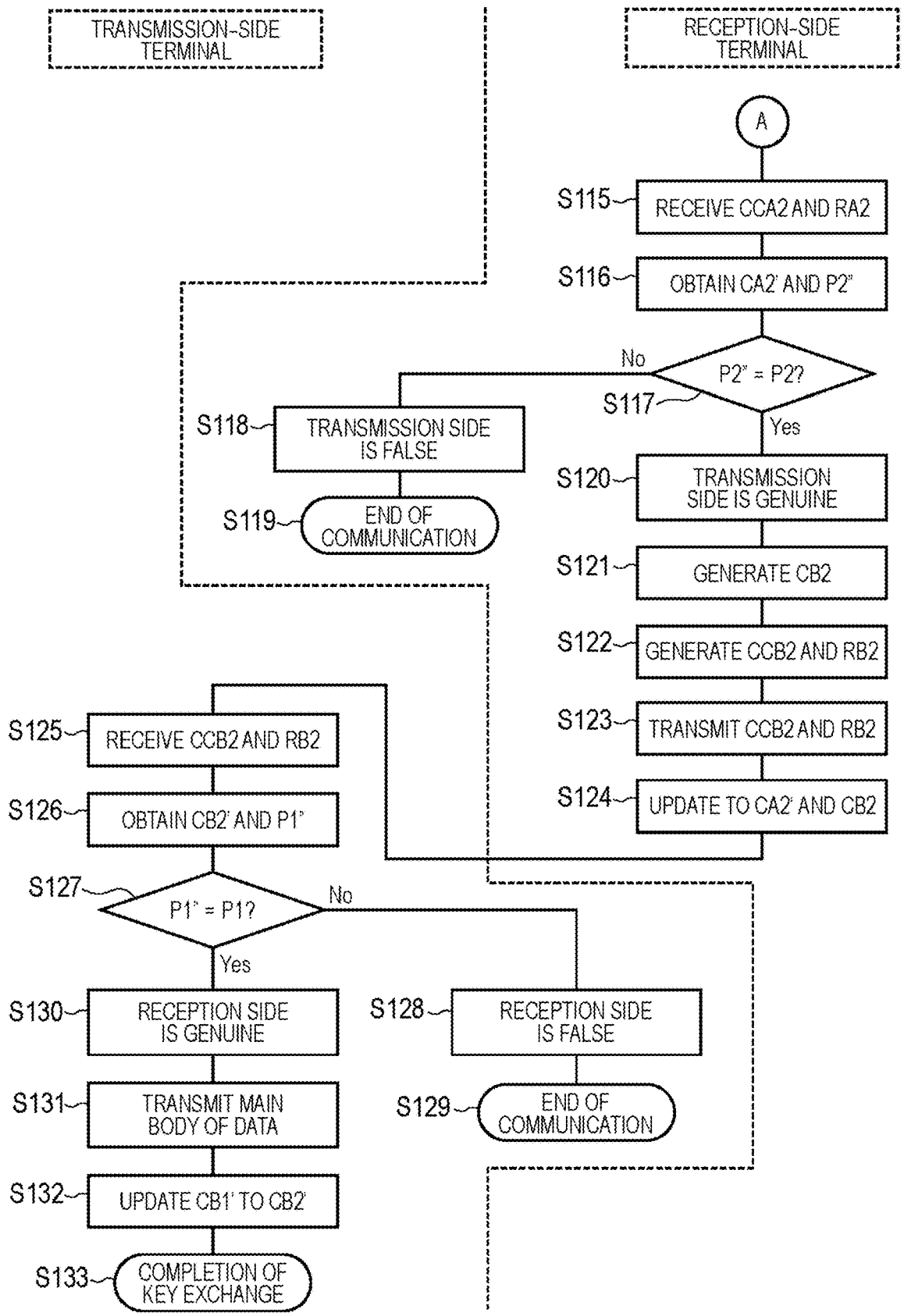
FIG. 30B is a flow chart for illustrating the key exchange operation executed in Embodiment 4 by the system to which the apparatus according to the present invention is applied.

FIG. 30A and FIG. 30B are flow charts for the key exchange in Embodiment 4. When a key exchange session is started (Step S101), the PUU of the transmission-side terminal generates the identification numerical value (CA1) (Step S102). The transmission-side terminal uses the generated identification numerical value (CA1) to generate the encrypted communication identification numerical value (CCA1) and the encrypted mutual identification numerical value (RA1) (Step S103), and transmits the generated identification numerical values to the reception-side terminal (Step S104).

The reception-side terminal receives the encrypted mutual identification numerical value (RA1) and the encrypted communication identification numerical value (CCA1) (Step S105). The reception-side terminal obtains the communication identification numerical value (CA1') by decrypting the encrypted communication identification numerical value (CCA1) with the common key (K1), and obtains the identification code (P1') of the transmission side by decrypting the encrypted mutual identification numerical value (RA1) with the obtained communication identification signal (CA1') (Step S106). Next, the PUU of the reception-side terminal generates the identification numerical value (CB1) (Step S107). The reception-side terminal uses the generated identification numerical value (CB1) to generate the encrypted communication identification numerical value (CCB1) and the encrypted mutual identification numerical value (RB1) (Step S108). The reception-side terminal transmits the generated identification numerical values to the transmission-side terminal (Step S109).

When the transmission-side terminal receives the encrypted communication identification numerical value (CCB1) and the encrypted mutual identification numerical value (RB1) (Step S110), the transmission-side terminal obtains the communication identification numerical value (CB1') by decrypting the encrypted communication identification numerical value (CCB1) with the common key (K1), and obtains the identification code (P2') of the reception side by decrypting the encrypted mutual identification numerical value (RB1) with the obtained communication identification signal (CB1') (Step S111).

When the transmission-side terminal is to newly start communication to/from the reception-side terminal, the PUU of the transmission-side terminal generates the identification numerical value (CA2) (Step S112). The transmission-side terminal uses the generated identification numerical value (CA2) to generate the encrypted communication identification numerical value (CCA2) and the encrypted mutual identification numerical value (RA2) (Step S113). The transmission-side terminal transmits the generated identification numerical values to the reception-side terminal (Step S114).

When the reception-side terminal receives the encrypted mutual identification numerical value (RA2) and the encrypted communication identification numerical value (CCA2) (Step S115), the reception-side terminal obtains the communication identification numerical value (CA2') by decrypting the encrypted communication identification numerical value (CCA2) with its own communication identification numerical value (CB1), and obtains the identification code (P2") of the transmission side by decrypting the encrypted mutual identification numerical value (RA2) with the obtained communication identification signal (CA2') (Step S116).

When the identification code (P2") is not equal to the identification code (P2) ("No" in Step S117), the reception-side terminal determines that the transmission-side terminal is not genuine (Step S118), and ends communication to/from the transmission-side terminal (Step S119). When the identification code (P2") is equal to the identification code (P2) ("Yes" in Step S117), the reception-side terminal determines that the transmission-side terminal is genuine (Step S120).

When the transmission-side terminal is genuine, the reception-side terminal next generates the communication identification numerical value (CB2) (Step S121). The reception-side terminal uses the generated identification numerical value (CB2) to generate the encrypted communication identification numerical value (CCB2) and the encrypted mutual identification numerical value (RB2) (Step S122). The reception-side terminal transmits the generated identification numerical values to the transmission-side terminal (Step S123). The reception-side terminal updates the communication identification numerical value of the other party terminal from (CA1') to (CA2'), and updates its own communication identification numerical value from (CB1) to (CB2) (Step S124).

When the transmission-side terminal receives the encrypted mutual identification numerical value (RB2) and the encrypted communication identification numerical value (CCB2) (Step S125), the transmission-side terminal obtains the communication identification numerical value (CB2') by decrypting the encrypted communication identification numerical value (CCB2) with its own communication identification numerical value (CA1), and obtains the identification code (P1") of the transmission side by decrypting the encrypted mutual identification numerical value (RB2) with the obtained communication identification signal (CB2') (Step S126).

When the identification code (P1") is not equal to the identification code (PT) ("No" in Step S127), the transmission-side terminal determines that the reception-side terminal is not genuine (Step S128), and ends communication to/from the reception-side terminal (Step S129). When the identification code (P1") is equal to the identification code (P1) ("Yes" in Step S127), the transmission-side terminal determines that the reception-side terminal is genuine (Step S130).

When the reception-side terminal is genuine, the transmission-side terminal next transmits the main body of the data to the reception-side terminal (Step S131). The transmission-side terminal updates the communication identification numerical value of the other party terminal from (CB1') to (CB2'), and updates its own identification numerical value from (CA1) to (CA2) (Step S132), and ends the encryption key exchange (Step S133).

Embodiment 5

Figure 23:
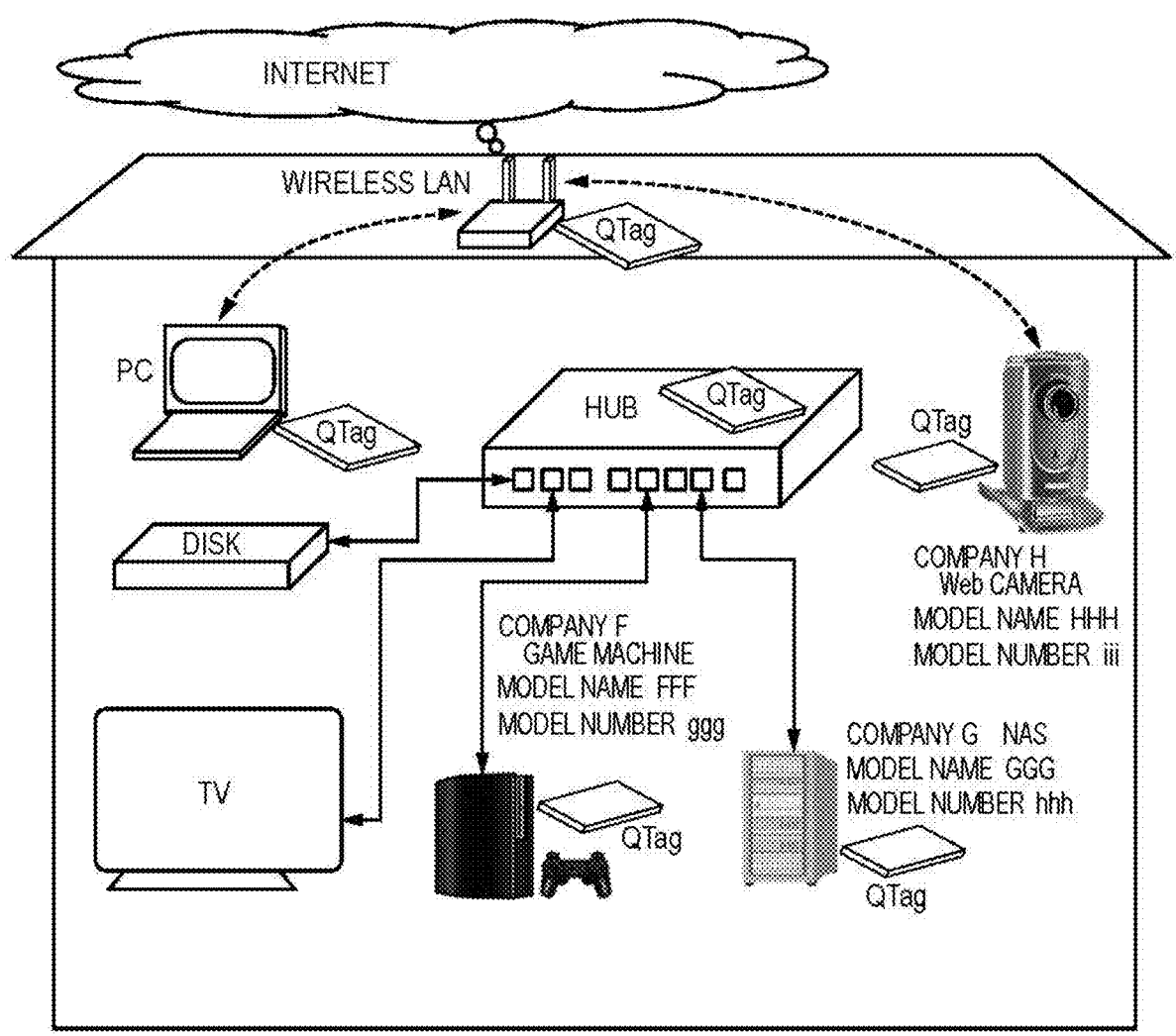
FIG. 23 is a diagram for illustrating yet still another example of the system to which the apparatus according to the present invention is applied.

As an application example of the Qtag described above (an example of the application mode of the PUU. The described model is made up of a pulse generation device (APG) and a memory, and does not include a power source. See FIG. 7), a case of managing a household electric appliances connection network in home is illustrated in FIG. 23. Specifically, the example given here is a case in which the Qtag is incorporated (built in or externally connected) into home network equipment to be used for mapping.

Various apparatus of various manufacturers are connected to a home network. In order for a manufacturer to maintain and manage the home network, it is very important to find out the map of the home network from the outside, and there are standards instituted for that purpose (for example, Home-network Topology Identifying Protocol (HTIP)). The ID reliability of those pieces of equipment can be enhanced greatly by adding the device of the present invention to the equipment.

The device of the present invention is also expected to be useful in the future as a way to find out the length of elapsed time and a way to prevent falsification in order to manage when to replace node parts in a network that is used for a long term.

In the illustrated example, a wireless LAN and a wired LAN are built in home. A PC and a Web camera are connected to the wireless LAN. A disk, a game machine, and a network attached storage (NAS) are connected to the wired LAN via a hub. The Qtag is incorporated in the master unit of the wireless LAN, the PC, the Web camera, the game machine, and the NAS each.

Embodiment 6

Figure 24:
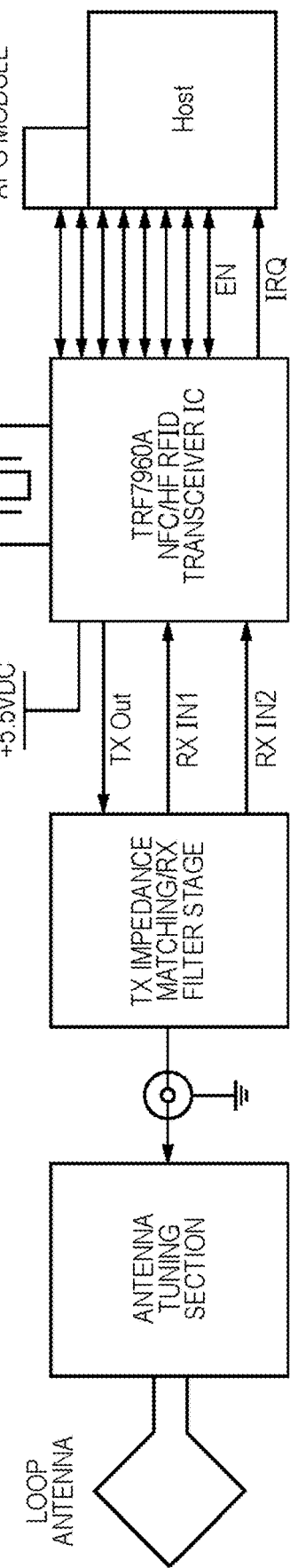
FIG. 24 is a block diagram for illustrating another example of the device to which the apparatus according to the present invention is applied.

A short-range wireless communication-type device in which the PUU (APG module) of the present invention is combined with a Near Field Communication (NFC) tag or an IC card (the device is hereinafter referred to as "QNFC" tag) is illustrated in FIG. 24 as an example.

The configuration in which the device of the present invention is combined with an NFC chip equipped with a short-range wireless communication function that follows standards for a radio frequency identifier (RFID) or other standards, is employed so that an option of sampling pulses more frequently than in the Qtag described above is available. Power may be supplied by a non-contact technology for NFC. Data is output by the standards of NFC, and the device is treated as a special NFC device.

The device in the illustrated example has a structure in which the APG module is incorporated into an NFC tag that includes a loop antenna, an antenna tuning section, a TX impedance matching/RX filter stage, and an RFID transceiver IC. A host (PC, MPU, or the like) is connected in FIG. 24 to process data.

In the case of an IC card with the NFC function, for example, a transit fare card, the genuineness of the IC card and theft detection are easily accomplished when it is possible to record, in a recording partition inside the IC card, a history ID that changes based on identification numerical values (random numbers) generated for each session on the card side and the server side. When there are a plurality of recording partitions, a safe IC card capable of dealing with a plurality of services can be manufactured.

Means of other standards, for example, Bluetooth (trademark) and Zigbee (trademark) may be used for short-range wireless communication.

Embodiment 7

Figure 25:
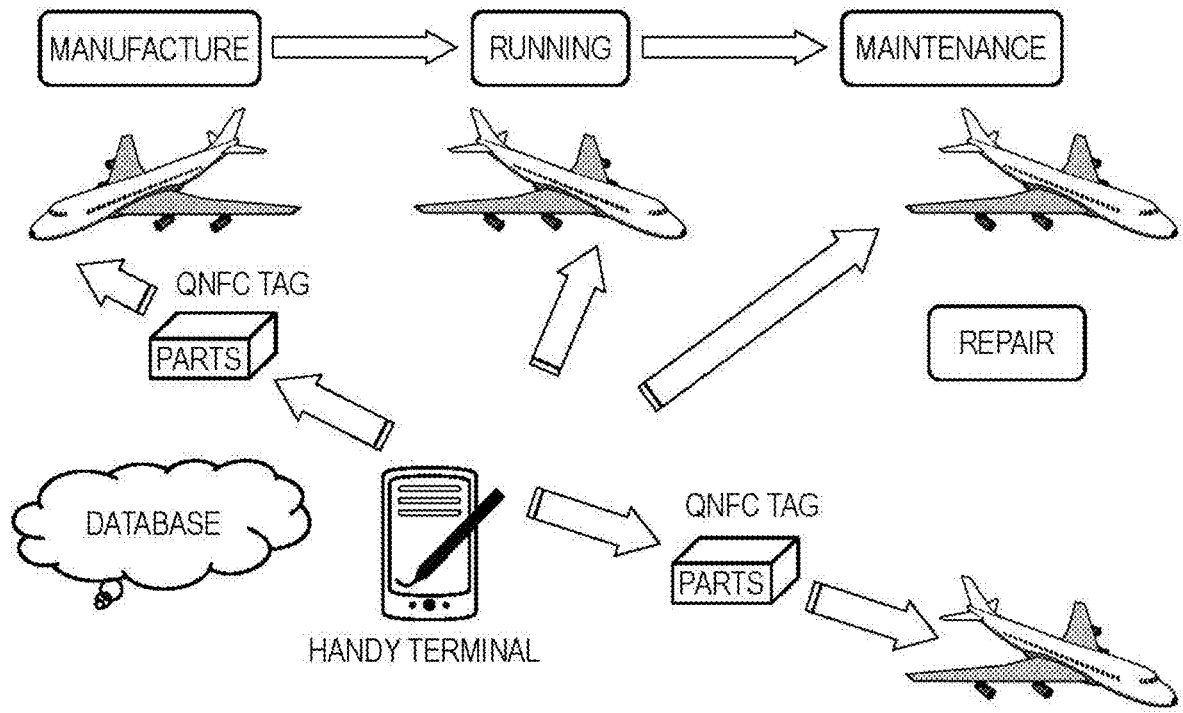
FIG. 25 is an explanatory diagram for illustrating an example of a system to which the device of FIG. 24 is applied.

FIG. 25 is a diagram for illustrating an example of a case of managing parts in the manufacture, running, maintenance, and repair of an airplane with the use of a device in which the PUU is incorporated in an RFID (a handy terminal is used for the parts management in the illustrated example). In the illustrated example, QNFC tags are incorporated in parts. This allows discrimination between a counterfeit or an imitation and a genuine product in parts management and at other occasions. Pulses of a part to which the device is mounted can be extracted wirelessly, and hence the genuineness of the part can be certified without fail by leaving the part on a reader for a while, in parts management of a mechanical apparatus, an airplane, a vehicle, or the like.

Particularly in aircraft industry, in which the number of parts is very large and the gravity of need for parts management is also high for security reasons, parts management using the technology of a chip that has a short-range wireless communication (NFC) function (an RFID) is already practiced.

However, data written on the RFID chip is digital data and can accordingly be copied, which gives rise to the risk of, for example, a counterfeit and falsification of a valid period.

When a device having uniqueness is incorporated in the RFID chip and proper database management is exercised, the reliability in security and safety can be improved significantly. The PUU is expected to be indispensable for the manufacture, running, management, and repair of an airplane in the future.

Embodiment 8

Figure 26:
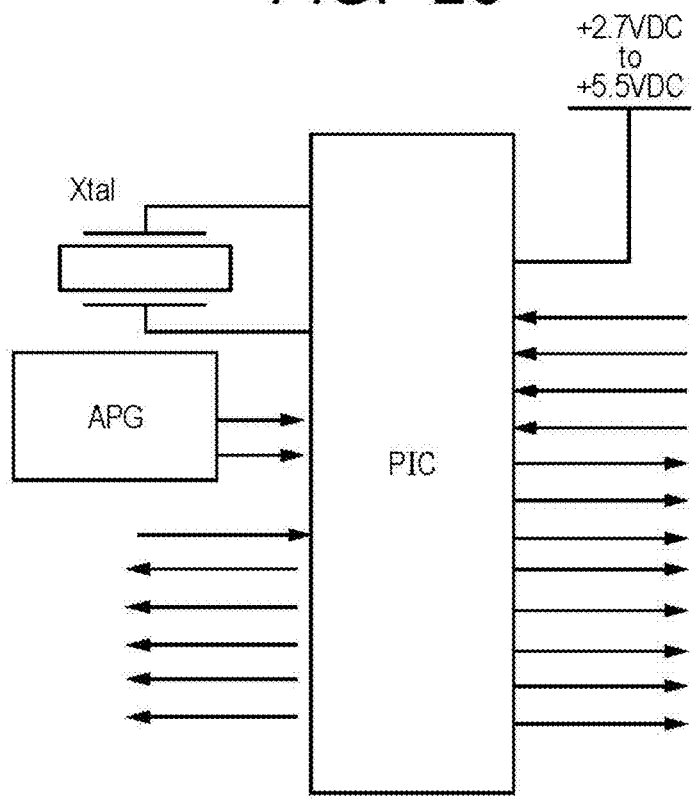
FIG. 26 is a block diagram for illustrating still another example of the device to which the apparatus according to the present invention is applied.

The Qtag described above is a model of the PUU that does not has a power source and is made up of an APG and a memory. A unit illustrated in FIG. 26, on the other hand, is a model of the PUU in which a power source is installed, an APG and a peripheral interface controller (PIC: an IC for controlling the connectivity of peripheral equipment) are included, and a discriminant function can be calculated by the PIC.

This unit is mounted particularly to network equipment or the like whose genuineness is checked aggressively. The unit is capable of performing calculation on generated pulses by itself owing to the built-in PIC, and can accordingly output a random number at will. When the unit is housed in a node in a network, the random number can therefore be embedded in communication of other pieces of data transmitted and received, as the need arises.

However, A/D conversion for quantizing the voltage is required to analyze the energy distribution of pulses. When this is difficult to accomplish with a single PIC, a simplified method may be adopted in which the voltage classification structure is consolidated to a degree effective for identification, and an electronic voltage determination circuit is provided in a manner suitable for the consolidated classification structure, and output of the voltage determination circuit is used in place of A/D conversion. This circuit may be provided on the pulse generation circuit side. A structure that has two PICs, one for signal processing and recording and one for communication, may also be employed.

Having a built-in power source, the unit is in constant operation, and can constantly measure and update the current pulse value in the background. The unit can thus respond in real time to a request for data for time stamp authentication or the like.

Embodiment 9

Figure 27:
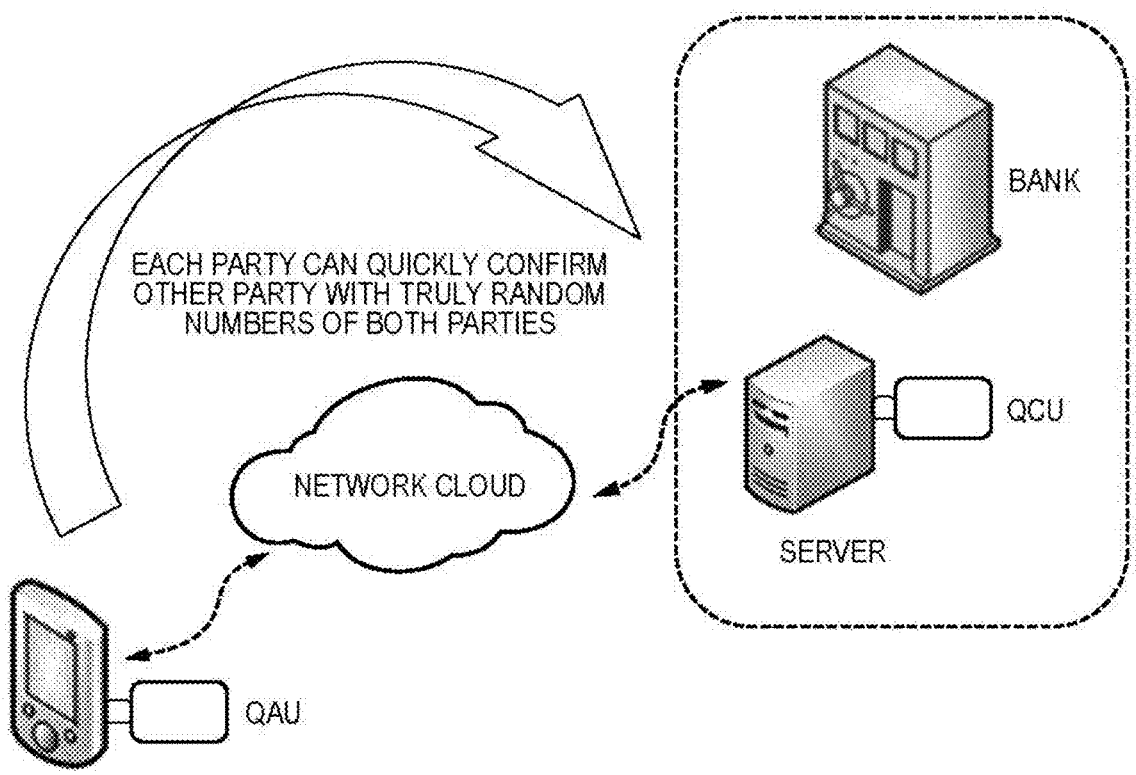
FIG. 27 is an explanatory diagram for illustrating an example of a system to which the device of FIG. 26 is applied.

A case in which the unit of Embodiment 8 is applied to individual authentication for internet banking is illustrated in FIG. 27. In FIG. 27, a terminal-side quantum authentication unit (QAU) and a server-side quantum communication unit (QCU) each correspond to the unit of Embodiment 8. Quantum authentication refers to the authentication function of the invention of this application, which is based on uniqueness utilizing spontaneous decay of a radioisotope.

Individual authentication in internet banking at present is conducted commonly by asking a user to input an ID and a password on the screen when the user makes a bank transaction from a smartphone or a PC over the Internet as illustrated in FIG. 27. However, passwords of users are managed in a simple manner and can be guessed in no time. In addition, authentication can be breached by hacking in some cases, and a considerable amount of damage has been incurred in fact. As a way to improve security, a tool that changes the password for each access (one-time password) is used among others. However, this, too, is easily breached by a real-time, man-in-the-middle, attack in which the attacker impersonates, for example, a server of a bank, leads a user to access the server under false pretense, and then impersonates the user with the use of the user's ID and password obtained while the user is connected to the Internet. Withdrawal of the user's deposit and other illicit acts result from the breach.

This situation can be dealt with by the system illustrated in FIG. 27, in which a PUU is provided in each of the user's terminal and the bank's server (a quantum authentication unit (QAU) on the terminal side and a quantum communication unit (QCU) on the bank's server side), so that access cannot be made unless both end points of the network are confirmed as genuine by following authentication steps that are illustrated in, for example, FIG. 10.

Embodiment 10

Figure 28:
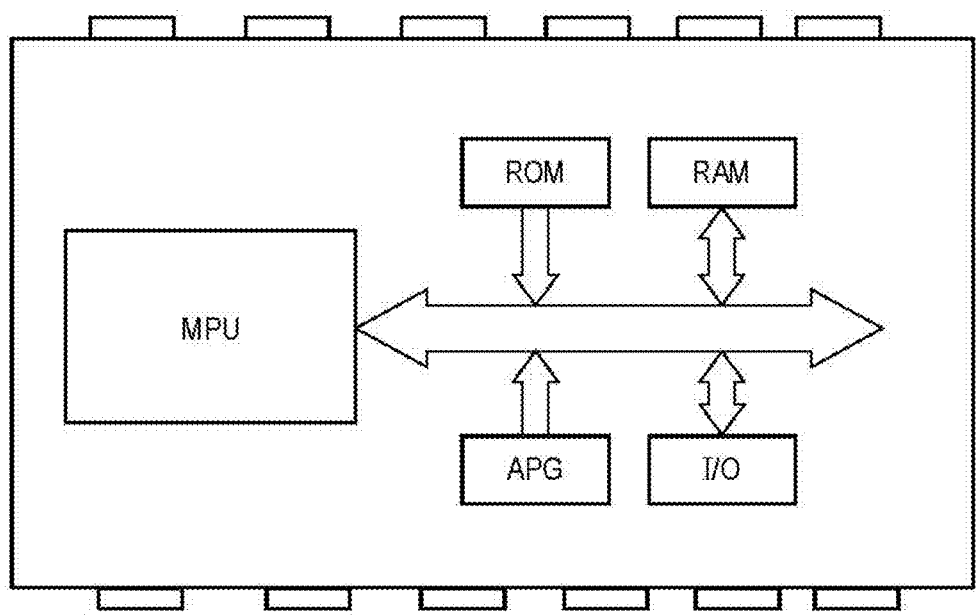
FIG. 28 is a block diagram for illustrating yet still another example of the device to which the apparatus according to the present invention is applied.

FIG. 28 is a diagram for illustrating a PUU of the type that includes an MPU and a memory having an ample capacity for high calculation performance, and that is capable of conducting authentication. This unit includes an APG, a memory, an MPU, an I/O interface, and others, and is a model for uses that require a sophisticated verification function and a sophisticated certification function. As in the unit (PIC type) of Embodiment 8, this unit continues measurement in the background and can accordingly prepare a necessary parameter any time. The unit has the following characteristics:

Constantly operating on a power source

Including a built-in A/D converter, which means that the energy distribution can be classified finely, thereby enabling the unit to generate more identification numerical values (random numbers) in a short time Having a CPU function capable of hash calculation for electronic signature Capable of adding the validity of its own node to data that is flowing in the network all the time Achieving a quantum authentication function with which a signature for certifying uniqueness, the time stamp, and the like is autonomously calculated and given to a measurement value that is generated by its own node, and to data requested by another node to be certified Embodiment 11

Figure 29:
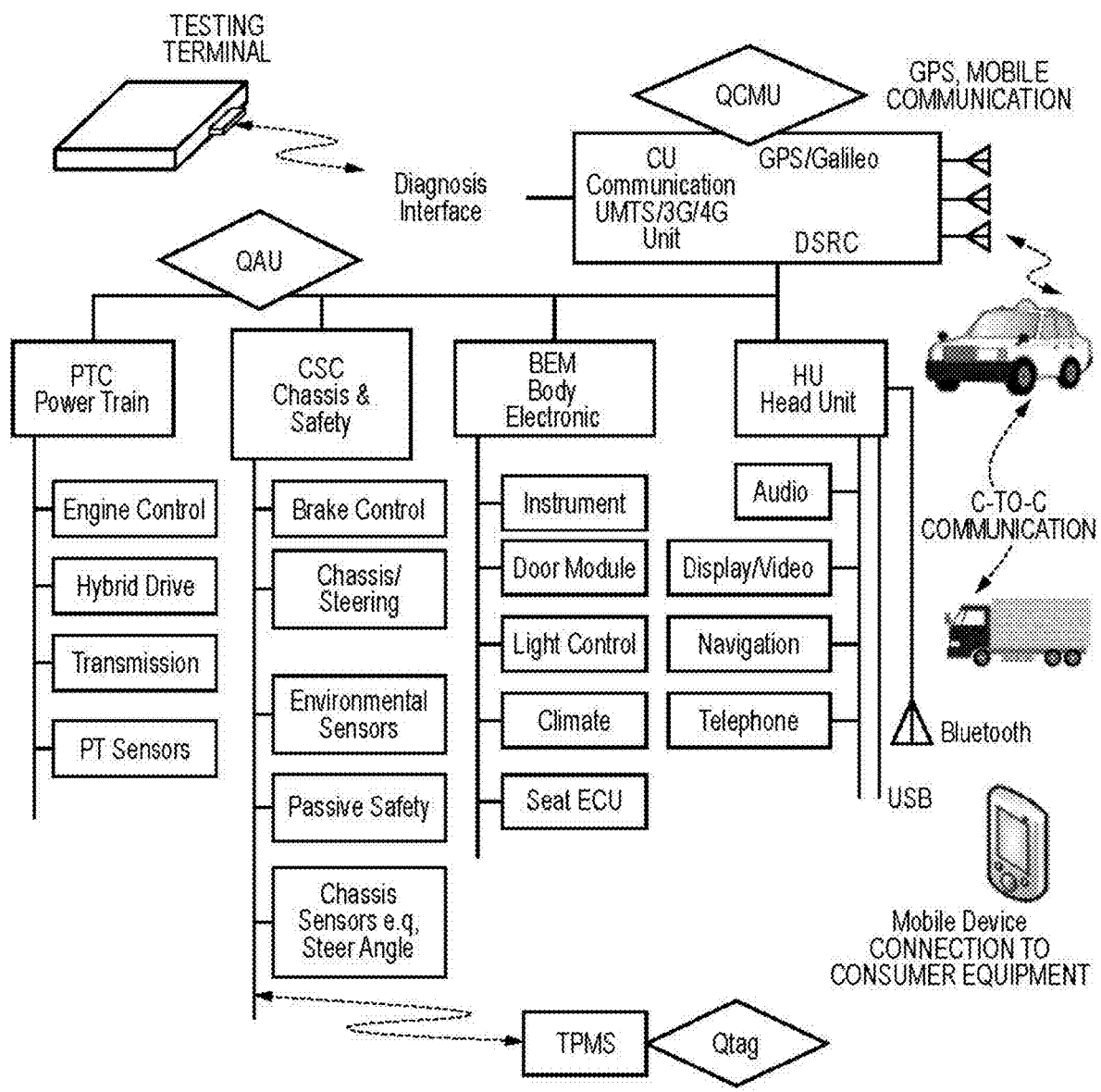
FIG. 29 is an explanatory diagram for illustrating an example of a system to which the device of FIG. 28 is applied.

FIG. 29 is a diagram for illustrating a case in which the unit of Embodiment 10 is applied to the security of an in-vehicle information network of an automobile (the architecture of the in-vehicle LAN is based on literature of IPA).

A quantum authentication unit (QAU) and a quantum communication management unit (QCMU) in FIG. 29 each correspond to the unit of Embodiment 10.

In FIG. 29, a diagnosing terminal connects to a diagnosis interface of a communication unit (CU) wirelessly (by Wi-Fi or the like), and a vehicle uses GPS to hold mobile communication to/from the CU. Vehicles can communicate to each other by car-to-car (C-to-C) communication. Connection between a mobile device, or other types of consumer equipment, and a head unit (HU) is wired or wireless, and is made via a USB and Bluetooth (trademark). A TRSM (a tire air pressure monitoring system including a tire pressure sensor) is connected wirelessly to a Chassis & Safety Controller (CSC).

Automobiles today are not a simple assembly of an engine and a vehicle body that has a traveling function, and a very large number of pieces of information communication equipment are incorporated in an automobile to build an "in-vehicle LAN (CAN)", which enables the automobile to connect to various installations (terminals and equipment), and to information networks external to the vehicle. As illustrated in FIG. 29, wireless connection between a vehicle and a diagnosing terminal via a "diagnosis interface", and monitoring of tire air pressure by a wirelessly connected tire sensor are already practiced. Inadequate security in such wireless connection is breached by hacking or other illicit acts, which leads to extensive damage including unauthorized unlocking of the vehicle, obstruction of safe driving, and a loss of customer information about the user. In addition, communication between vehicles is expected to develop in the coming years with the advance of a collision prevention function and a driverless driving function, and it is viewed that inadequate security increases the risk of accidents and misdeeds by allowing a third party to disrupt those communication functions.

When the QCMU and QAU of the present invention, which have sophisticated communication information processing functions, are installed in important controllers (PTC, CSC, BEM, HU, and others) of the in-vehicle LAN (CAN) as illustrated in FIG. 29, every communication of the CAN is to and from a genuine party and illicit access from the outside is completely eliminated by following authentication steps that are illustrated in, for example, FIG. 10. A quick and highly efficient encryption function by means of an XOR command as the one described in, for example, Embodiment 3 or Embodiment 4 is also available for use, and solid security is ensured by encrypting all communication messages.

The QCMU and the QAU can also be run in cooperation with other network nodes to which a Qtag or the like is attached, thereby ensuring the reliability and safety of the system.

This application claims the benefit of priority from Japanese Patent Application No. 2015-113609, filed on Jun. 4, 2015, and Japanese Patent Application No. 2016-110314, filed on Jun. 1, 2016, the content of which is incorporated herein by reference.

The invention claimed is:

1. An apparatus, which is configured to generate an arbitrary number of identification numerical values,
the apparatus comprising an apparatus including a pulse generation device and a memory,
the pulse generation device including:
an emitter, which includes a radioisotope containing a number of atoms greater than a total number of identification targets; and
a detector, which is configured to detect an α particle, a β ray, and/or a γ ray (hereinafter referred to as "α particle and others") emitted from the emitter due to spontaneous decay of an atomic nucleus to generate electric pulses,
the memory being configured to store a number of electric pulses obtained by measuring, in advance, for a given period of time, the electric pulses that are generated in the pulse generation device (hereinafter referred to as "initial pulse count"), a date of the measurement, and an identification numerical value obtained by digitizing a pulse interval between the electric pulses (hereinafter referred to as "initial identification numerical value"),
wherein a plurality of identification numerical values that are obtained through A/D conversion of wave height values of the electric pulses generated by the pulse generation device, and a plurality of identification numerical values that are obtained by digitizing the pulse interval between the electric pulses, are combined to form a matrix of identification numerical values, whereby each of the identification numerical values in the matrix is a combination of one of the former type of identification numerical values and one of the latter type of identification numerical values joined to each other, or added to each other, or multiplied by each other, or calculated by XOR operation after conversion into a binary number.

2. An apparatus according to claim 1,
wherein the apparatus comprises a plurality of apparatus each including the pulse generation device, which includes the emitter and the detector, and the memory, and
wherein, in each of the plurality of apparatus, a pulse interval between electric pulses generated by the each of the plurality of apparatus is digitized to obtain a plurality of identification numerical values, and an arbitrary number of identification numerical values are generated by joining the plurality of identification numerical values or by performing addition, multiplication, or conversion into a binary number followed by XOR operation, or an arbitrary number of identification numerical values are generated by combining a plurality of numerical values that are generated in the plurality of apparatus, respectively, into a multi-dimensional matrix, and then joining numerical values in a combination from the multi-dimensional matrix to each other, or by performing addition, multiplication, or XOR operation on the combination.

3. A system, comprising at least two terminals, pieces of equipment, or the like between which information including digital data is transmitted and received by wireless communication or wired communication,
wherein one or both of the at least two terminals include a pulse generation device and a memory that generates identification numerical values for authentication of the at least two terminals, pieces of equipment, or the like and/or for verification of the information,
wherein the pulse generation device includes:
an emitter, which includes a radioisotope containing a number of atoms greater than a total number of identification targets; and
a detector, which is configured to detect an α particle, a β ray, and/or a γ ray thereinafter referred to as "α particle and others") emitted from the emitter due to spontaneous decay of an atomic nucleus to generate electric pulses,
wherein the memory is configured to store a number of electric pulses obtained by measuring, in advance, for a given period of time, the electric pulses that are generated in the pulse generation device (hereinafter referred to as "initial pulse count"), a date of the measurement, and an identification numerical value obtained by digitizing a pulse interval between the electric pulses (hereinafter referred to as "initial identification numerical value"), and
wherein a plurality of identification numerical values that are obtained through A/D conversion of wave height values of the electric pulses generated by the pulse generation device, and a plurality of identification numerical values that are obtained by digitizing the pulse interval between the electric pulses, are combined to form a matrix of identification numerical values, whereby each of the identification numerical values in the matrix is a combination of one of the former type of identification numerical values and one of the latter type of identification numerical values joined to each other, or added to each other, or multiplied by each other, or calculated by XOR operation after conversion into a binary number.

4. A system, comprising at least two terminals between which information is transmitted and received by wireless communication or wired communication,
wherein a first terminal of the at least two terminals includes a pulse generation device and a memory, and an initial identification numerical value of the first terminal is registered in advance in a second terminal of the at least two terminals,
wherein, in initial access, the first terminal sends the initial identification numerical value and a new identification numerical value (N1) generated in the first terminal to the second terminal,
wherein the second terminal checks the sent initial identification numerical value against the registered initial identification numerical value, authenticates the first terminal as genuine when the two initial identification numerical values are confirmed to be a match, and registers the sent new identification numerical value (N1) as a current identification numerical value,
wherein, in next and subsequent access, the first terminal sends, to the second terminal, the identification numerical value (N1) generated in the last access (the current identification numerical value) on the first terminal, and an identification numerical value (N2) (a new identification numerical value) newly generated separately from the identification numerical value (N1),
wherein the second terminal checks the sent identification numerical value (N1) (the current identification numerical value) against the registered current identification numerical value, authenticates the first terminal as genuine when the two identification numerical values are confirmed to be a match, and updates the registered current identification numerical value with the sent identification numerical value (N2) (the new identification numerical value)
wherein the pulse generation device includes:
an emitter, which includes a radioisotope containing a number of atoms greater than a total number of identification targets; and
a detector, which is configured to detect an α particle, a β ray, and/or a γ ray thereinafter referred to as "α particle and others") emitted from the emitter due to spontaneous decay of an atomic nucleus to generate electric pulses,
wherein the memory is configured to store a number of electric pulses obtained by measuring, in advance, for a given period of time, the electric pulses that are generated in the pulse generation device (hereinafter referred to as "initial pulse count"), a date of the measurement, and an identification numerical value obtained by digitizing a pulse interval between the electric pulses (hereinafter referred to as "initial identification numerical value"), and
wherein a plurality of identification numerical values that are obtained through A/D conversion of wave height values of the electric pulses generated by the pulse generation device, and a plurality of identification numerical values that are obtained by digitizing the pulse interval between the electric pulses, are combined to form a matrix of identification numerical values, whereby each of the identification numerical values in the matrix is a combination of one of the former type of identification numerical values and one of the latter type of identification numerical values joined to each other, or added to each other, or multiplied by each other, or calculated by XOR operation after conversion into a binary number.

5. A system, comprising at least two terminals between which information is transmitted and received by wireless communication or wired communication,
wherein each of the at least two terminals includes a pulse generation device and a memory, and a common key (K1) is held in both of the at least two terminals in advance,
wherein, in an initial session, a transmission-side terminal of the at least two terminals encrypts an identification code (P1) of the transmission-side terminal and the common key (K1) held in the transmission-side terminal with an identification numerical value (CA1) generated on the transmission-side terminal, and sends the encrypted identification code and the encrypted common key to a reception-side terminal of the at least two terminals,
wherein the reception-side terminal decrypts the received encrypted common key with the common key (K1) that is held in the reception-side terminal to obtain an identification numerical value (CA1'), decrypts the encrypted identification code with the decrypted identification numerical value (CA1') to obtain a decrypted identification code (P1'), registers the decrypted identification numerical value (CA1') and the decrypted identification code (P1'), along with an identification numerical value (CB1) generated on the reception-side terminal, encrypts an identification code (P2) of the reception-side terminal and the common key (K1) held in the reception-side terminal with an identification numerical value (CB1) generated on the reception-side terminal, and sends the encrypted identification code and the encrypted common key to the transmission-side terminal, wherein the transmission-side terminal decrypts the received encrypted common key with the common key (K1) that is held in the transmission-side terminal to obtain an identification numerical value (CB1'), decrypts the encrypted identification code (P2) with the decrypted identification numerical value (CB1') to obtain a decrypted identification code (P2'), and registers the decrypted identification numerical value (CB1') and the decrypted identification code (P2'), along with the identification numerical value (CA1) generated on the transmission-side terminal, wherein the transmission-side terminal encrypts the registered identification code (P2') and the registered identification numerical value (CB1') with an identification numerical value (CA2), which is newly generated on the transmission-side terminal, as an encryption key, and sends the encrypted registered identification code and the encrypted registered identification numerical value to the reception-side terminal, wherein the reception-side terminal decrypts the received encrypted identification numerical value with the identification numerical value (CB1) generated on the reception-side terminal to obtain an identification numerical value (CA2'), decrypts the encrypted identification code with the decrypted identification numerical value (CA2') to obtain a decrypted identification code (P2"), checks the obtained identification code (P2") against the identification code (P2) of the reception-side terminal, authenticates the transmission-side terminal as genuine when the two identification codes are confirmed to be a match, updates the identification numerical value (CA1'), which is the decrypted encryption key registered in association with the registered identification code (P1'), to the decrypted identification numerical value (CA2'), wherein the reception-side terminal similarly encrypts the registered identification code (P1') and the registered identification numerical value (CA1') with an identification numerical value (CB2), which is newly generated on the reception-side terminal, as an encryption key, and sends the encrypted registered identification code and the encrypted registered identification numerical value to the transmission-side terminal, wherein the transmission-side terminal decrypts the received encrypted identification numerical value with the identification numerical value (CA1) generated on the transmission-side terminal to obtain an identification numerical value (CB2'), decrypts the encrypted identification code with the decrypted identification numerical value (CB2') to obtain a decrypted identification code (P1"), checks the obtained identification code (P1") against the identification code (P1) of the transmission-side terminal, authenticates the reception-side terminal as genuine when the two identification codes are confirmed to be a match, and performs encryption key exchange by updating the identification numerical value (CB1'), which is a decrypted encryption key registered in association with the registered identification code (P2'), to the decrypted identification numerical value (CB2'), wherein, in next and subsequent sessions, identification numerical values newly generated on the transmission-side terminal and the reception-side terminal are used, in place of the common key (K1), to encrypt the identification numerical value (CB2', . . . ), which is the updated transmission-side encryption key, the identification numerical value (CA2', . . . ), which is the updated reception-side encryption key, the identification code (P2) of the reception-side terminal, which is registered on the transmission-side terminal, and the identification code (P1) of the transmission-side terminal, which is registered on the reception-side terminal, and each of the transmission-side terminal and the reception-side terminal sends the encrypted identification numerical value and the encrypted identification code to another of the transmission-side terminal and the reception-side terminal, which is then followed by encryption key exchange performed in the same manner as in the initial session, wherein the pulse generation device includes:
  an emitter, which includes a radioisotope containing a number of atoms greater than a total number of identification targets; and
  a detector, which is configured to detect an α particle, a β ray, and/or a γ ray thereinafter referred to as "α particle and others") emitted from the emitter due to spontaneous decay of an atomic nucleus to generate electric pulses, wherein the memory is configured to store a number of electric pulses obtained by measuring, in advance, for a given period of time, the electric pulses that are generated in the pulse generation device (hereinafter referred to as "initial pulse count"), a date of the measurement, and an identification numerical value obtained by digitizing a pulse interval between the electric pulses (hereinafter referred to as "initial identification numerical value"), and wherein a plurality of identification numerical values that are obtained through A/D conversion of wave height values of the electric pulses generated by the pulse generation device, and a plurality of identification numerical values that are obtained by digitizing the pulse interval between the electric pulses, are combined to form a matrix of identification numerical values, whereby each of the identification numerical values in the matrix is a combination of one of the former type of identification numerical values and one of the latter type of identification numerical values joined to each other, or added to each other, or multiplied by each other, or calculated by XOR operation after conversion into a binary number.

6. A system according to claim 5,
wherein, after the transmission-side terminal and the reception-side terminal are authenticated and the encryption key exchange is conducted, the transmission-side terminal encrypts digital data as information with the identification numerical value (CA2) generated in the encryption key exchange on the transmission-side terminal, and sends the encrypted digital data to the reception-side terminal, and wherein the reception-side terminal decrypts the received encrypted digital data with the identification numerical value (CA2') registered as an encryption key in the encryption key exchange.

7. An apparatus, comprising the apparatus of claim 1, wherein a time of measurement of a count that is obtained by measuring the number of pulses generated in the apparatus of claim 1 for a given length of time is estimated based on the count, on the initial pulse count, which is recorded in the memory of the apparatus of claim 1, and on the date of measurement of the initial pulse count, and the estimated time is used as a time stamp in time stamp authentication.

8. An apparatus, comprising the apparatus of claim 1, wherein an elapsed time since a time of measurement of the initial pulse count, which is recorded in the memory of the apparatus of claim 1, till a time of measurement of a count that is obtained by measuring the number of pulses generated in the apparatus of claim 1 for a given length of time is estimated based on the count and on the initial pulse count, and a time limit to a valid use of the detector is determined based on the elapsed time.

9. An apparatus according to claim 1, wherein efficiency of radiation detection is improved by providing the detector so as to enclose the emitter inside, or an improvement is made through parallel generation of electric pulses from a plurality of detectors by providing the plurality of detectors so that the emitter is surrounded by the plurality of arranged detectors.

10. A system, comprising at least two terminals between which digital data is transmitted and received by wireless communication or wired communication,
wherein at least a transmission-side terminal of the at least two terminals includes a pulse generation device and a memory, and an initial pulse count of the apparatus, a date of initial measurement, and an initial identification numerical value are registered in advance on the transmission side,
wherein the transmission-side terminal calculates a hash value of digital data by a hash function, encrypts the hash value with the initial identification numerical value, and sends the encrypted hash value and the digital data in a plain text format, or the encrypted hash value and the digital data encrypted with the initial identification numerical value, to a reception-side terminal of the at least two terminals,
wherein the reception-side terminal decrypts the sent encrypted hash value with the initial identification numerical value that is registered in the reception-side terminal, performs hash calculation, by using the same hash function that is used on the transmission side, on the sent digital data, or on digital data that is obtained by decrypting the encrypted digital data with the initial identification signal, to calculate a hash value of the digital data, and determines whether the digital data is tampered data by comparing the calculated hash value to the decrypted hash
wherein the pulse generation device includes:
an emitter, which includes a radioisotope containing a number of atoms greater than a total number of identification targets; and
a detector, which is configured to detect an α particle, a β ray, and/or a γ ray thereinafter referred to as "α particle and others") emitted from the emitter due to spontaneous decay of an atomic nucleus to generate electric pulses,
wherein the memory is configured to store a number of electric pulses obtained by measuring, in advance, for a given period of time, the electric pulses that are generated in the pulse generation device (hereinafter referred to as "initial pulse count"), a date of the measurement, and an identification numerical value obtained by digitizing a pulse interval between the electric pulses (hereinafter referred to as "initial identification numerical value"), and
wherein a plurality of identification numerical values that are obtained through A/D conversion of wave height values of the electric pulses generated by the pulse generation device, and a plurality of identification numerical values that are obtained by digitizing the pulse interval between the electric pulses, are combined to form a matrix of identification numerical values, whereby each of the identification numerical values in the matrix is a combination of one of the former type of identification numerical values and one of the latter type of identification numerical values joined to each other, or added to each other, or multiplied by each other, or calculated by XOR operation after conversion into a binary number.

11. A system according to claim 10,
wherein the transmission-side terminal further measures a current pulse count of the apparatus, encrypts the current pulse count and the hash value with the initial identification numerical value of the transmission-side terminal, and sends the encrypted data to the reception-side terminal, and
wherein the reception-side terminal registers a date/time of reception of the sent encrypted data, decrypts the current pulse count, from the encrypted data, with the initial identification numerical value that is registered in the reception-side terminal, estimates an elapsed time since a time of initial measurement of the apparatus by comparing the decrypted current pulse count to the initial pulse count that is registered in the reception-side terminal, calculates a time of measurement of the current pulses from the estimated elapsed time and from the registered date of initial measurement, and performs time stamp authentication by checking the calculated measurement time against the registered reception date/time.

12. An apparatus, comprising an IC card, an NFC device, or the like having a short-range wireless communication function and including the apparatus of claim 1,
wherein the apparatus of claim 1 is mounted to, built in, or constructed unitarily with the IC card, the NFC device, or the like.

13. An apparatus according to claim 1, wherein a PIC or an MPU is built in or constructed unitarily with the apparatus to enable the apparatus to internally perform function calculation.

14. An apparatus according to claim 1,
wherein the number of atoms is determined based on a scale of a market in which the apparatus is used, and
wherein one of ways to measure the scale of the market is a total number of pieces of equipment and apparatus used in the market.

15. An apparatus according to claim 14, wherein the contained atoms include $^{210}Pb$-$^{210}PO$ and $^{241}Am$.

* * * * *